(12) United States Patent
Saylor

(10) Patent No.: US 8,943,187 B1
(45) Date of Patent: Jan. 27, 2015

(54) MANAGING ELECTRONIC KEYS

(71) Applicant: MicroStrategy Incorporated, Vienna, VA (US)

(72) Inventor: Michael J. Saylor, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 144 days.

(21) Appl. No.: 13/735,102

(22) Filed: Jan. 7, 2013

Related U.S. Application Data

(60) Provisional application No. 61/694,992, filed on Aug. 30, 2012.

(51) Int. Cl.
*G06F 15/173* (2006.01)
*H04L 29/08* (2006.01)

(52) U.S. Cl.
CPC .............................. *H04L 29/08306* (2013.01)
USPC ........................................ 709/223; 709/225

(58) Field of Classification Search
USPC ......... 709/200, 201–203, 208–211, 217, 223, 709/227; 340/5.6, 5.61; 726/1, 6, 19, 26, 29
See application file for complete search history.

(56) References Cited

U.S. PATENT DOCUMENTS

| | | | |
|---|---|---|---|
| 6,000,609 A * | 12/1999 | Gokcebay et al. ............ 235/382 |
| 7,012,503 B2 * | 3/2006 | Nielsen ........................... 340/5.6 |
| 7,325,132 B2 * | 1/2008 | Takayama et al. ............ 713/168 |
| 8,665,212 B2 * | 3/2014 | Lacey ............................ 345/156 |
| 2002/0180582 A1 * | 12/2002 | Nielsen ........................... 340/5.6 |
| 2004/0039919 A1 * | 2/2004 | Takayama et al. ............ 713/180 |
| 2005/0088279 A1 * | 4/2005 | Denison et al. .............. 340/5.23 |
| 2007/0096866 A1 * | 5/2007 | Denison et al. .............. 340/5.23 |
| 2008/0142671 A1 * | 6/2008 | Bourrieres et al. ........... 248/551 |
| 2008/0149711 A1 * | 6/2008 | Griffits et al. ................. 235/385 |
| 2008/0297481 A1 * | 12/2008 | Higginson ..................... 345/169 |
| 2009/0319316 A1 * | 12/2009 | Westerfeld et al. ............... 705/7 |
| 2010/0082491 A1 | 4/2010 | Rosenblatt et al. |
| 2011/0210818 A1 * | 9/2011 | Denison et al. ................. 340/5.6 |
| 2012/0011367 A1 * | 1/2012 | Denison ........................ 713/170 |
| 2013/0009858 A1 * | 1/2013 | Lacey ............................ 345/156 |
| 2013/0120106 A1 * | 5/2013 | Cauwels et al. ............... 340/3.1 |
| 2013/0132169 A1 * | 5/2013 | Dooley et al. ................. 705/14.1 |
| 2013/0211891 A1 * | 8/2013 | Daniel et al. ................. 705/14.16 |
| 2013/0312116 A1 * | 11/2013 | Park ................................. 726/28 |
| 2013/0335193 A1 * | 12/2013 | Hanson et al. ............... 340/5.61 |
| 2014/0129630 A1 * | 5/2014 | Nikain ........................... 709/204 |

OTHER PUBLICATIONS

ASSA ABLOY Mobile Keys at ISC West Las Vegas [online], [retrieved on May 21, 2012]. Retrieved from the Internet: http://www.assaabloy.com/en/com/Press-News/News/2011/ASSA-ABLOY-Mobile-Keys-Platform-Debuts-at-ISC-West, 2 pages.

(Continued)

*Primary Examiner* — Sargon Nano
(74) *Attorney, Agent, or Firm* — Fish & Richardson P.C.

(57) ABSTRACT

Users of a social networking platform may provide electronic keys to other users of the social networking platform. Use of an electronic key may be subject to one or more conditions specified by the issuer of the electronic key. Data may be provided that enables the recipient to use the electronic key in accordance with the one or more conditions on use of the electronic key.

20 Claims, 17 Drawing Sheets

(56) References Cited

OTHER PUBLICATIONS

Björn Hellgren unlocks his hotel room with ASSA ABLOY Mobile Keys [online], [retrieved on May 21, 2012]. Retrieved from the Internet: http://www.assaabloy.com/en/com/Press-News/News/2011/The-customer-experience-of-ASSA-ABLOY-Mobile-Keys/, dated May 2, 2011, 2 pages.

GSMA highlights ASSA ABLOY NFC Mobile Keys solutions [online], [retrieved on May 21, 2012]. Retrieved from the Internet: http://www.assaabloy.com/en/com/Press-News/News/2012/NFC-access-control-highlighted-by-GSMA-at-Mobile-World-Congress/, dated Mar. 8, 2012, 2 pages.

Keyless entry with ASSA ABLOY Mobile Keys for secure and environment friendly access control [online], [retrieved on May 21, 2012]. Retrieved from the internet http://www.assaabloy.com/en/com/Products/ASSA-ABLOY-Mobile-Keys/, dated Apr. 28, 2011, 2 pages.

Mobile Phone Car Key [online], [retrieved on May 21, 2012]. Retrieved from the Internet: http://www.gadgetvenue.com/mobile-phone-car-key-10011618/, dated Oct. 1, 2008, 3 pages.

New generation of access control and mobile access control with NFC technology ASSA ABLOY [online], [retrieved on May 21, 2012]. Retrieved from the internet: http://www.assaabloy.com/en/com/Press-News/News/2011/NFC-enabled-mobile-access-in-a-physical-access-control-world/, dated Sep. 2, 2011, 2 pages.

"Evaluation of the world's first pilot using NFC phones for check-in and hotel room keys," [online], [retrieved on May 21, 2012]. Retrieved from the Internet: http://www.assaabloy.com/Global/Products/Products-old/ASSA-ABLOY-Mobile-Keys/Report-ASSA-ABLOY-Mobile-Keys-Pilot-Clarion.pdf, 6 pages.

* cited by examiner

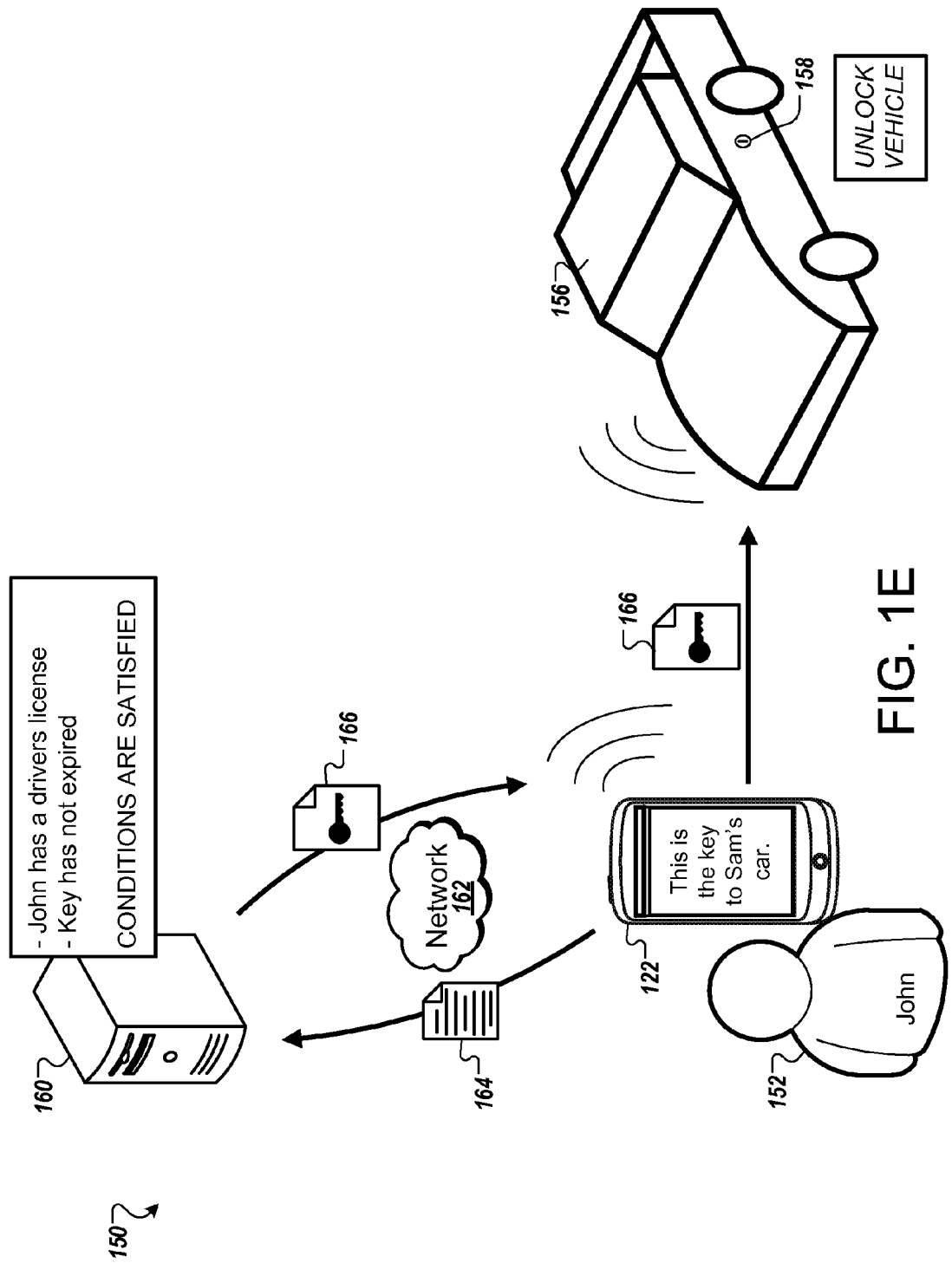

MANAGING ELECTRONIC KEYS

CROSS-REFERENCE TO RELATED APPLICATION

This application claims the benefit of U.S. Patent Application Ser. No. 61/694,992, filed on Aug. 30, 2012, which is incorporated herein by reference in its entirety.

TECHNICAL FIELD

This disclosure relates to managing electronic keys.

BACKGROUND

Locks are used to control access to many items and areas, such as buildings, vehicles, and storage containers. Frequently, a lock is opened with a physical key shaped for the lock. Typically, different locks are opened with different keys. Consequently, many people carry several physical keys in order to be able to open different locks.

SUMMARY

This disclosure relates to managing electronic keys.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 1E is a schematic diagram illustrating an example of a system for using an electronic key.

DETAILED DESCRIPTION

Figure 1A:
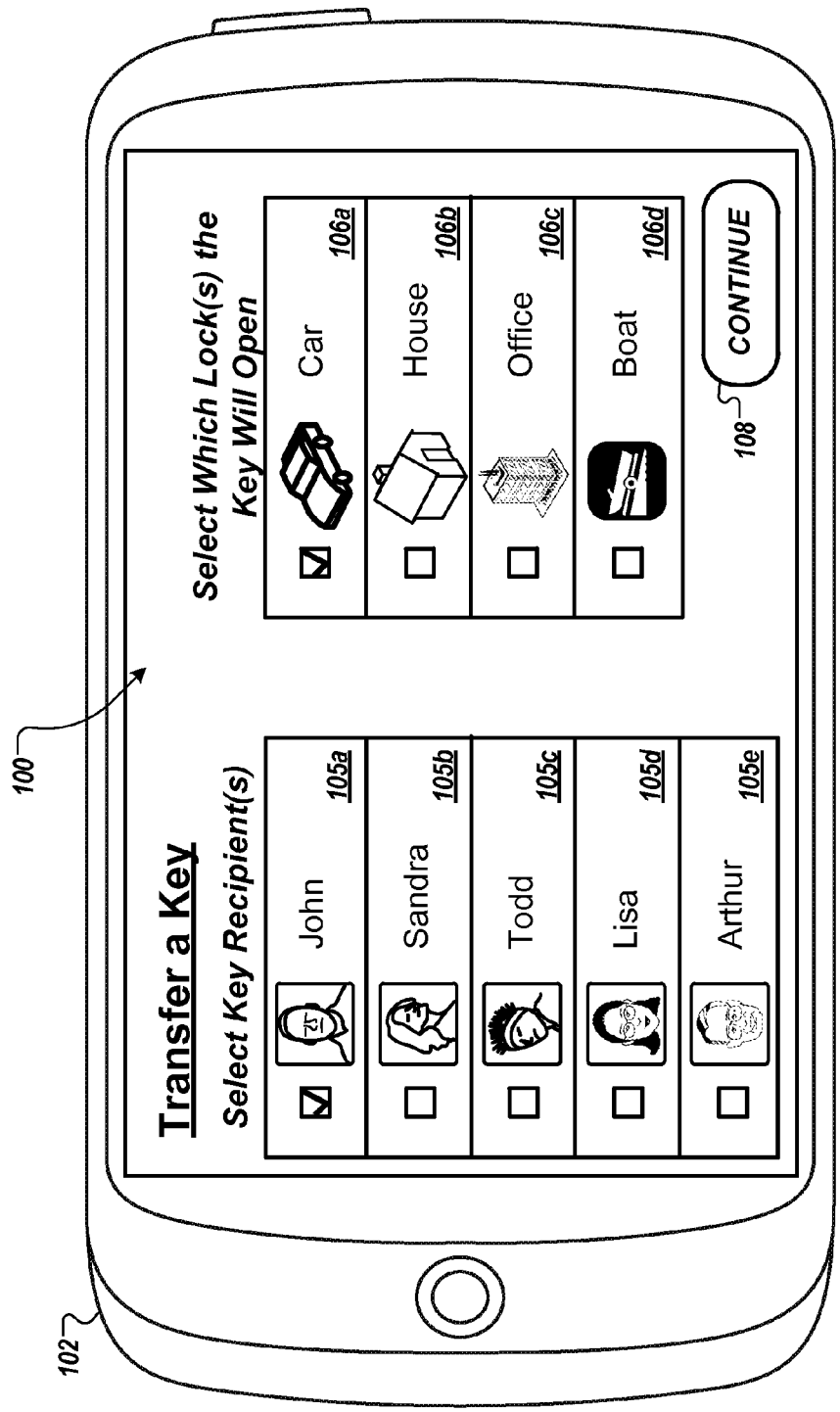
FIG. 1A is a diagram illustrating an example of a user interface for transferring an electronic key using a social networking platform.

Techniques are described for enabling users to distribute electronic keys to other users. For example, techniques are described for enabling users of a social networking platform to distribute electronic keys to other users of the social networking platform. In some implementations, a user of the social networking platform selects a lock that the user controls, such as a lock for a door to the user's house or lock for the user's vehicle. The user also selects a member of the user's social network as a recipient for a key to the lock. For example, the user may select the recipient of the key from among users designated as friends of the user in a social networking platform. A key management server issues to the recipient an electronic key that opens the lock. The recipient can then use an electronic device, such as a mobile phone, to activate the electronic key, thereby opening the lock. For example, the recipient's electronic device can receive access data from the key management system, and the electronic device can provide the access data to the lock to open the lock.

The user that issues the electronic key may impose one or more conditions on the use of the electronic key by the recipient. For example, the issuer may limit a number of times the electronic key may be used, limit a window of time during which the electronic key may be used, require the recipient to possess certain qualifications to use the electronic key, and/or place other restrictions or constraints on use of the electronic key. In some implementations, when one or more conditions are imposed on the use of an electronic key, the key management server determines whether the one or more conditions are satisfied each time use of the electronic key is attempted. When all of the one or more conditions are determined to be satisfied, the key management server permits the lock to be opened. When the one or more conditions are not satisfied, the key management server does not permit the lock to open.

In some implementations, managing electronic keys using social networking platforms allows users to quickly and conveniently provide keys to other users. By selecting the recipient for an electronic key from among the user's social networking connections, a user can quickly select recipients whom the user trusts. Using social networking connections to transfer the electronic key can also help ensure that the intended recipient, instead of someone else, actually receives the electronic key. Selecting a recipient with whom the issuer has a relationship in a social networking platform can help avoid a transfer to an incorrect user due to, for example, mistyping an electronic address or designating a user with a name that is confusingly similar to the name of the desired recipient.

In some implementations, issuing an electronic key rather than a physical key may provide a number of other advantages. Electronic keys can be transferred through remote action of the issuer, while physical keys must be physically transported from one location to another. When a user issues an electronic key, the user's own ability to open the corresponding lock is not diminished. By contrast, a person that transfers a physical key must give up use of the physical key to complete the transfer. A user may issue multiple electronic keys without affecting the user's own access, and without incurring the expense of duplicating a physical key. Further, after an electronic key has been issued, the user may revoke or temporarily disable the electronic key quickly and remotely.

In some implementations, electronic keys relieve the recipient of the electronic keys of the need to carry multiple keys. Rather than carry multiple physical keys each of which is dedicated to opening a particular lock, a single electronic device, such as a mobile phone, can act as the key to open any lock for which an electronic key has been granted. In addition, electronic keys can be linked to a user identity rather than being limited to a single physical device. For example, if a user's personal mobile phone is unavailable, the user may log in to his user identity using another electronic device to use electronic keys granted to him. When electronic keys are linked to a user identity, the electronic keys may be less likely to be misplaced or stolen than physical keys.

In some implementations, by setting conditions on the use of electronic keys, users can specify the type of access permitted to particular recipients of an electronic key. Different recipients of an electronic key can be given different levels of access selected by the key issuer. In addition, the issuer of an electronic key can also change the conditions for use of an electronic key quickly and remotely, for example, through interaction with a server system over a network. The issuer may thus retain a degree of control over electronic keys, through conditions on the use of the electronic keys and/or through the ability to revoke the electronic keys.

As an example, a parent may issue to a teenage child an electronic key to an automobile. The parent may place conditions that allow unrestricted use of the electronic key during designated times, such as on weekdays between 7:00 am and 9:00 am and 3:00 pm and 6:00 pm, to allow the child to travel to and from school. The conditions can specify that, at other times, each use of the electronic key to start the ignition for the automobile requires approval from the parent, which the parent can provide remotely using his or her mobile phone. In addition, the electronic key issued by the parent may be a "valet key" that, for example, permits entry to the vehicle and ignition, but does not provide access to storage compartments or other functionality of the automobile.

As another example, an executive may grant to his assistant an electronic key that unlocks the executive's office door. However, the executive can impose the condition that the electronic key may only be used when the executive is not present in the office. The executive may also grant, to each of the information technology staff and cleaning staff in the company, an electronic key that unlocks the office. The conditions on the electronic key can require that, for these recipients, the electronic key can only be used when the executive is not present in the office and one of a designated set of supervisors is present at the office.

In some implementations, a system receives data identifying a recipient for an electronic key to a physical lock, where the recipient is connected to the user in a social networking platform. The system also receives data identifying the physical lock to which the user desires to provide the electronic key. The physical lock may be selected from a set of locks to which the user has authority to grant access. The system receives data indicating one or more conditions on use of the electronic key. The system stores, in electronic storage, key data that identifies the recipient of the electronic key, the lock for which the electronic key is granted, and the one or more conditions on use of the electronic key. The system accesses, from profile data for the recipient from the social networking platform, an electronic address for the recipient. The system transmits, to the electronic address for the recipient, data that indicates that the electronic key is transferred to the recipient. The system transmits, to the electronic address for the recipient, data that enables the recipient to use the electronic key in accordance with the one or more conditions on use of the electronic key.

Thereafter, the system may receive, from an electronic device, use data indicating an attempted use of the electronic key. The request may identify the electronic key and include description information that describes the attempted use of the electronic key. The system accesses the stored key data, and evaluates the description information against the key data. Based on the evaluation, the system determines that the attempted use of the electronic key satisfies the one or more conditions on use of the electronic key. In response to determining that the attempted use of the electronic key satisfies the one or more conditions, the system transmits, to the electronic device, an access code that unlocks the lock.

Figure 1B:
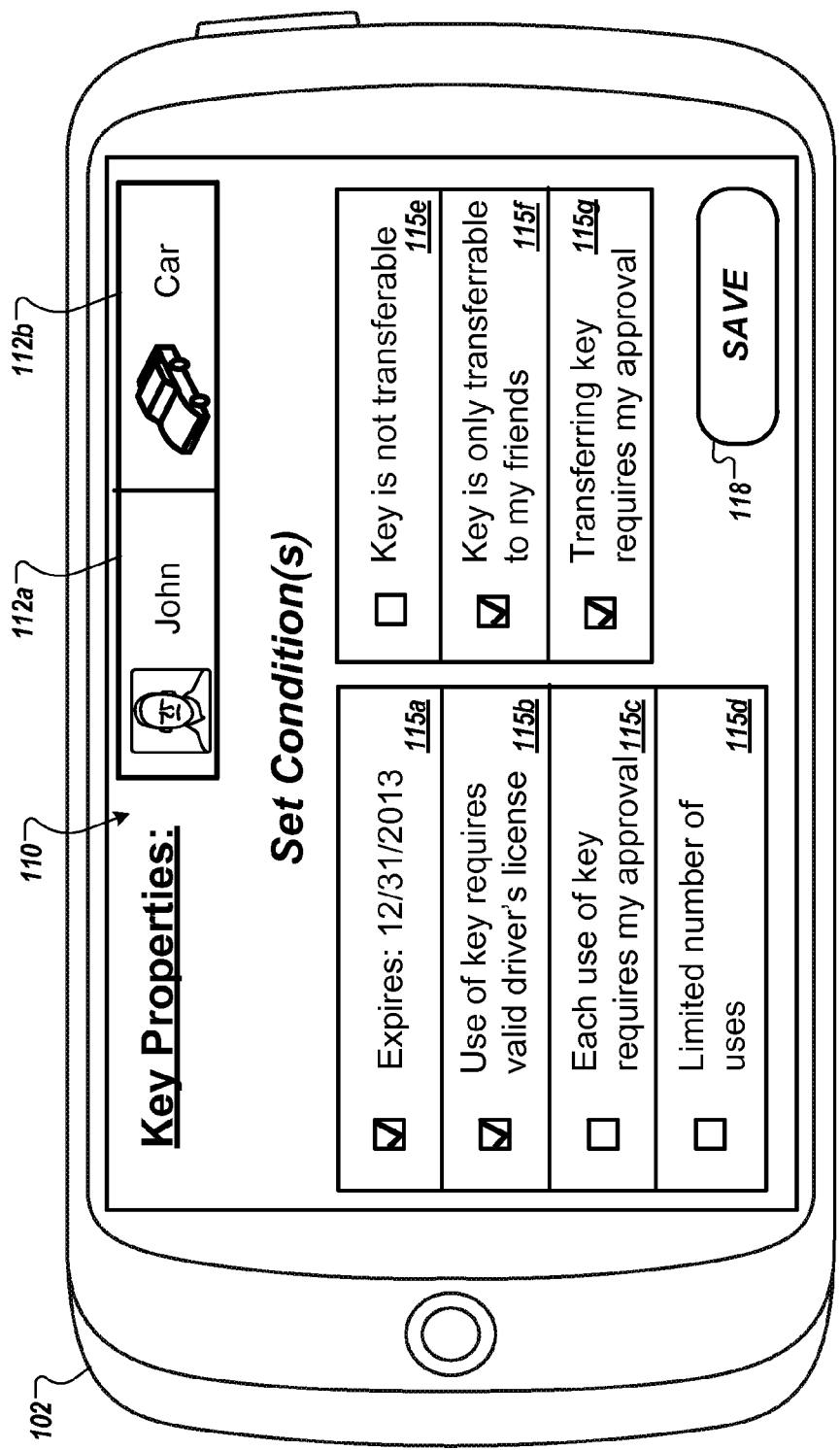
FIG. 1B is a diagram illustrating an example of a user interface for setting conditions on use of an electronic key.

FIGS. 1A-1E illustrate an example of transferring an electronic key from a user, referred to as a key issuer, to a recipient. The key issuer selects the recipient for the electronic key and the lock that the electronic key will open (FIG. 1A). The key issuer also selects one or more conditions that limit use of the electronic key (FIG. 1B). The recipient is notified that the electronic key has been issued (FIGS. 1C and 1D), and the recipient then uses the electronic key to open the lock (FIG. 1E).

FIG. 1A illustrates an example of a user interface 100 for transferring an electronic key using a social networking platform. The user interface 100 may be displayed on a phone or other electronic device 102. In some implementations, the user interface 100 is provided by an application running on the electronic device 102. In other implementations, the user interface 100 is a rendering of a web page or other document.

The user interface 100 enables the key issuer to select one or more recipients to receive an electronic key. In particular, the user interface 100 identifies members of the key issuer's social network in a social networking platform. Examples of social networking platforms include Facebook, Twitter, LinkedIn, Google+, MySpace, and Orkut, to name a few. Electronic social networking platforms may permit human users of the social networking platform to create user identities within the social networking platform and establish connections with the user identities of other users. The members of the key issuer's social network include, for example, users whose social networking user identities are connected to the social networking user identity for the key issuer within the social networking platform.

Electronic social networking platforms may indicate a variety of relationships between human users of the social network. Examples of these relationships include social friendships, family relationships, professional relationships, and affiliations with groups or organizations. Relationships are often represented by connections between user identities corresponding to the respective human users. When a connection exists between user identities, and thus a relationship also exists between the associated human users, one user may be termed a "friend," a "connection," a "follower," or a "subscriber" of another user, or the relationship may have another designation.

In the illustrated example, the user interface 100 includes user interface elements 105*a*-105*e* that identify users who are connected to the key issuer in a social networking platform (e.g., users designated in a social networking platform as friends of the key issuer, family members of the key issuer, etc.). Also in the illustrated example, each of the user interface elements 105*a*-105*e* includes a name and photo from the social networking profile for the corresponding user. Other information from the social networking profile of a user (e.g., current status, hometown, current location, etc.) may additionally or alternatively be displayed. In addition, or as an alternative, data indicating the relationship of the social networking contact to the user in a social networking platform can be provided (e.g., whether a social networking contact is designated as a friend, a close friend, a family member, a co-worker, etc. in one or more social networking platforms).

By interacting with the user interface elements 105a-105e, the key issuer may select a set of users to designate as recipients for the electronic key. For example, the key issuer may tap or otherwise interact with the user interface elements 105a-105e on a touchscreen of the electronic device 102 to select the users as recipients of the electronic key. Additionally or alternatively, the key issuer may utilize another input mechanism (e.g., a pointing device like a computer mouse or a keyboard) to interact with the user interface elements 105(a)-105(e).

In some implementations, the user interface 100 identifies users who are connected to the key issuer in different social networks. For example, multiple lists of friends of the key issuer can be included, where each of the multiple lists identifies friends of the key issuer in a different social networking platform. As another example, data from multiple social networking platforms may be combined so that users connected to the key issuer in different social networking platforms may be listed together in a single list or interface.

In some implementations, a set of multiple users can be identified on the user interface 100, and the key issuer can select the entire set to provide the same electronic key to each member of the set. For example, a subset of a user's friends (e.g., co-workers) can be defined in the social networking platform. The key issuer may be able to select a user interface element representing the subset to select all of the users in the subset to receive the electronic key.

The user interface 100 also enables the key issuer to select one or more locks that the electronic key will open. By selecting one or more locks, the key issuer can designate the type of electronic key that will be issued (e.g., a key to the key issuer's car, home, office, boat, etc.). The locks can be physical locks that control access to a physical device or physical space. For example, the locks can secure the door of a room or building, the ignition of a vehicle, entry to a file cabinet or safe, and so on.

In the illustrated example, the user interface 100 includes user interface elements 106a-106d that indicate locks for which the key issuer is authorized to grant keys (e.g., locks for which the key issuer owns access control). For example, the locks identified by the user interface elements 106a-106d can be locks that the key issuer or another user has previously registered as being under the key issuer's control. In some implementations, a key management system verifies the key issuer's authority to grant access to locks, and indicates only locks that have been successfully verified. In some implementations, if the key issuer has received an electronic key from another user and is permitted to share the key with others, the corresponding lock can be included in the list of locks to which the key issuer has been granted access.

After selecting one or more recipients for the electronic key and selecting one or more locks that the electronic key will open, the key issuer may interact with one or more controls 108 to submit the data indicating the selections to a key management system. The key management system may provide an electronic key to the selected recipients. In some implementations, transferring the electronic key does not affect the key issuer's access to the lock, but extends access to the recipient that the recipient did not previously enjoy. The key issuer may also set one or more conditions for use of the electronic key, as described further below.

FIG. 1B illustrates an example of a user interface 110 for setting conditions on use of an electronic key. The user interface 110 may be displayed on the electronic device 102, for example, during the process of initially transferring an electronic key or when modifying an electronic key that has already been transferred. In some implementations, the user interface 100 is provided by an application running on the electronic device 102. In other implementations, the user interface 100 is a rendering of a web page or other document.

The user interface 110 enables the key issuer to set the properties of an electronic key. In the illustrated example, the user interface 110 includes user interface elements 112a, 112b that identify the electronic key being modified. For example, the user interface element 112a identifies the user that is the recipient of the electronic key, and the user interface element 112b identifies the lock that the electronic key opens.

The user interface 110 enables the key issuer to select one or more conditions on the use of the electronic key. The conditions may specify limits to the use of the key by the recipient and/or limits to the ability of the recipient to transfer the key to others. In the illustrated example, the user interface 110 includes user interface elements 115a-115g that specify various conditions, which the key issuer may select to apply to the electronic key.

The key issuer may set time conditions that regulate the time that the electronic key may be used by the recipient. For example, the key issuer may specify a range of time during which the electronic key can be used by indicating a start time and/or end time that the electronic key is operable. In the illustrated example, the user interface element 115a specifies a condition that the electronic key will expire, and thus not be operable, after a particular date. A time condition may specify a recurring range of time during which the electronic key can be used (e.g., on weekends; nightly from 6:00-9:00 pm; etc.).

Some conditions on use of the electronic key may require that the recipient possess particular credentials or qualifications to use the electronic key. For example, the user interface element 115b specifies a condition that the electronic key for the vehicle is operable only when the recipient possesses a valid driver's license. Other examples of qualifications that may be required include meeting an age requirement (e.g., recipient must be at least a minimum age), holding a particular position in a company, and having no criminal record.

Conditions on use of the electronic key may require approval from the key issuer for actions requiring use of the electronic key. For example, the user interface element 115c specifies that each use of the electronic key requires approval of the key issuer. In some implementations, when the recipient attempts to use the electronic key, a key management system provides information about the attempted use to an application running on an electronic device associated with the key issuer. The application asks whether the key issuer approves the attempted use, and the key issuer can grant or deny approval. The input from the key issuer is transmitted to the key management system, which permits the electronic key to be used only if the attempted use was approved.

Conditions on use of the electronic key may limit the number of uses of the electronic key, as indicated by the user interface element 115d. For example, a key issuer may grant an electronic key that permits only a single use, or a predetermined number of uses (e.g., 3 uses, 10 uses, 20 uses, etc.).

Conditions on use of the electronic key may require the presence of the key issuer, the recipient, or others at the lock, or may require their absence, when the electronic key is used. The presence of a user can be determined based on the location of an electronic device associated with a user, near-field communication (NFC) between the electronic device and the lock, passwords, biometric input, and other techniques. As an example, a condition may specify that the electronic key is operable only when the key issuer is not present at the site of the lock. With this condition, the key issuer can avoid being disturbed by the entry of an unannounced visitor. The key issuer can be determined to be present near a lock when, for example, GPS data or other location data indicates that a phone or other electronic device associated with the key issuer is located within a threshold distance of the lock, or that the key issuer has opened the lock within a predetermined amount of time (e.g., 2 hours, 6 hours, 1 day, 3 days, etc.).

As another example, a condition can specify that the electronic key is only operable when the identity of the recipient is confirmed at the time the electronic key is used. Conditions may require multi-factor authentication of the recipient for an electronic key to be operable. For example, in addition to providing data identifying the recipient's phone or other electronic device, the recipient may be required to enter a password, provide a biometric input (e.g., through a fingerprint scan, retina scan, iris scan, facial image, speech sample, etc.), or provide another identifying input.

Conditions may also require the presence of a person at the site of the lock in addition to the recipient. For example, the electronic key may be operational only when the recipient is accompanied by one of a designated set of individuals, or by an individual that satisfies one or more criteria. For example, a teenager with a new driver's license may be issued an electronic key for a vehicle, with the condition that another person at least 21 years old that holds a driver's license must also be present. As another example, an employee may be granted an electronic key that opens a safe, but the electronic key is operational only when a manager or security guard is present with the employee. The presence of a particular person can be verified based on the presence of an electronic device associated with the particular person at the site of the lock, entry of a password, biometric input, and/or other techniques.

Conditions can also specify to what extent, if any, the recipient is permitted to transfer the received electronic key to other users. The user interface 110 includes user interface elements 115e-115g that indicate various conditions that affect transferability of an electronic key. The key issuer may specify that an electronic key is not transferable, as shown by the user interface element 115e. The key issuer may specify that the electronic key may be transferred to only a limited set of users, for example, users who have a particular relationship with the key issuer in one or more social networks. As indicated by the user interface element 115f, transfers may be limited to friends of the key issuer. In a similar manner, transfer of the electronic key can be limited to users who are connected to both the key issuer and the recipient in one or more social networks. In addition, or as an alternative, the key issuer may specify that each transfer of the electronic key requires approval from the key issuer.

In some implementations, when a first recipient transfers a received electronic key to a second recipient, the conditions on use of the electronic key for the first recipient are also applied to the electronic key received by the second recipient. In some implementations, additional or different conditions may be placed on the electronic key after the transfer.

After the key issuer selects the conditions, if any, that the key issuer desires to impose for the electronic key, the key issuer may interact with one or more controls 118 to save or confirm the selections. The key management system receives data indicating the conditions, and saves data identifying the conditions. The key management system then notifies the recipient of the newly issued key.

Figure 1C:
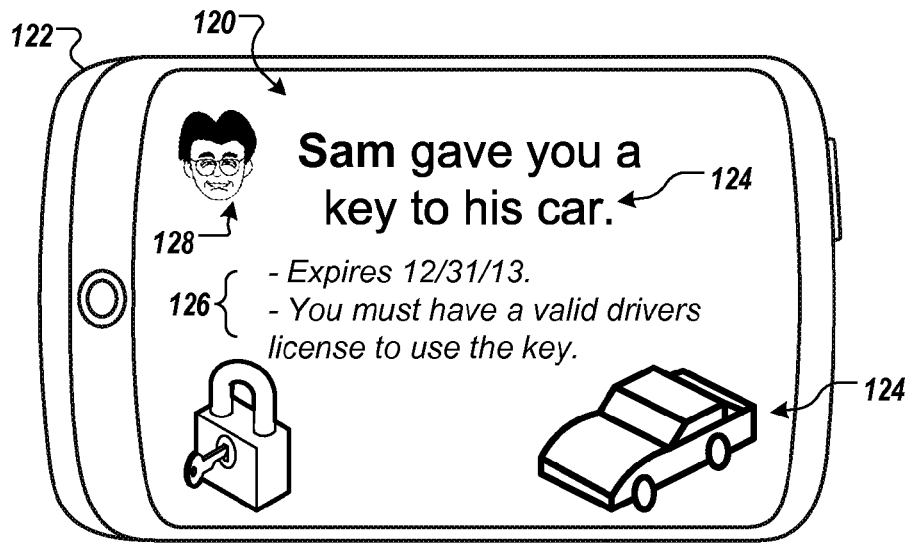
FIGS. 1C and 1D are diagrams illustrating examples of user interfaces for notifying a recipient of a transfer of an electronic key.

FIG. 1C illustrates an example of a user interface 120 for notifying a recipient of a transfer of an electronic key. The user interface 120 may be displayed on a phone or other electronic device 122, for example, the mobile phone of the recipient or another electronic device associated with the recipient. In some implementations, the user interface 120 is provided by an application running on the electronic device 122. In other implementations, the user interface 120 is a rendering of a web page, electronic mail message, or another document.

In some implementations, the key management system notifies a recipient when an electronic key is issued to the recipient or when conditions on the recipient's electronic key are modified. In the illustrated example, the user interface 120 notifies a recipient that a new electronic key has been issued to the recipient. The user interface 120 includes one or more indicators 124 that identify the lock that the electronic key opens, for example, with an identifier (e.g., address, room number, license plate number, etc.), image, and/or description. The user interface 120 also includes one or more user interface elements 126 that identify the conditions that limit use of the electronic key. The user interface 120 can provide identifying information 128 that identifies the key issuer, for example, a name, a social networking identifier, a photo, an electronic address, or other identifying information.

Figure 1D:
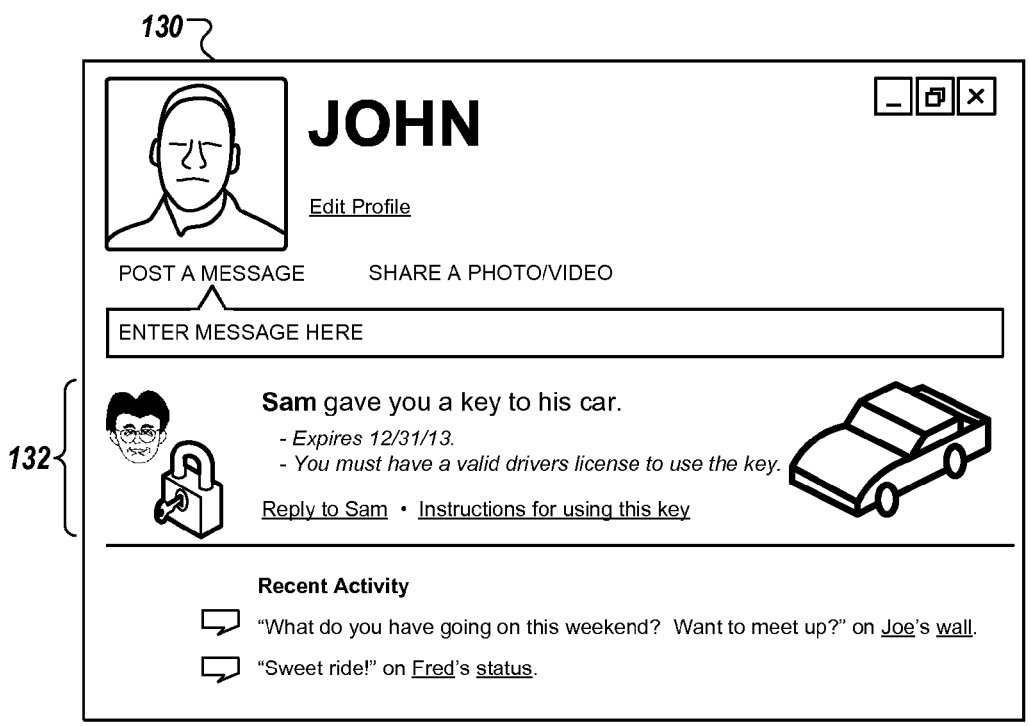

FIG. 1D illustrates an example of a user interface 130 for notifying a recipient of a transfer of an electronic key. The user interface 130 may be displayed on a phone or other electronic device 122, for example, the mobile phone of the recipient or another electronic device associated with the recipient. In some implementations, the user interface 120 is provided by an application running on the electronic device 122. In other implementations, the user interface 130 is a rendering of a web page, electronic mail message, or another document.

In some implementations, notifications about electronic keys can be provided through a social networking platform, in addition to, or as an alternative to, the notification shown in FIG. 1C and notifications through other channels (e.g., an SMS text message, an electronic mail message, etc.). In the illustrated example, the key management system distributes information about the electronic key in a user interface used to access a social networking platform, such as a "home page" or "wall" of the recipient. For example, when the recipient logs into the social networking platform, information about the electronic key may be provided as a status update, post, item in a news feed, or other social networking message or notice. Like the user interface 120 of FIG. 1C, the user interface 130 includes one or more user interface elements 132 that describe the electronic key by identifying, for example, the key issuer, the lock that the electronic key opens, and conditions on use of the electronic key.

In some implementations, the electronic device 122 receives access data that permits the electronic device 122 to open the lock. The key management system may provide the access data when the recipient logs into a key management application (e.g., executing on the electronic device and/or on a remote server) after the electronic key has been issued. The access data may be, for example, a numeric code, a text sequence, or data encoded in another form. For example, the access data may include data from which a Quick Response (QR) code, a bar code, or another image may be rendered. The electronic device 122 may display the image, and a scanner on the lock may read the image to confirm that access is permitted. As another example, the access data can describe a signal, such as a radio-frequency signal, infrared signal, or an ultrasonic signal (e.g., a sound wave with a frequency of approximately 20 kHz or more). The electronic device 122 can output the signal to the lock to transmit the access code, for example, using near-field communication (NFC) techniques, an electromagnetic radiation source, and/or a loudspeaker.

In some implementations, the access data may be stored on the electronic device 122, permitting the electronic device 122 to act as a key to open the lock. In some implementations, however, additional data, or other data, is required to open a lock. For example, data from the key management system may be required to verify that conditions on use of the electronic key are satisfied, as described further below. When an electronic key is revoked or disabled, the key management application on the electronic device 122 may delete or otherwise disallow access to the stored access data.

FIG. 1E is illustrates an example of a system 150 for using an electronic key. The recipient 152 of the electronic key uses the electronic device 122, such as a mobile phone, to apply the electronic key to a lock 158. The electronic key enables the recipient 152 to gain access to a resource 156 secured by the lock 158. The resource 156 can be a physical resource (e.g., such as a physical object or area). The lock can be a physical lock, such as a device that mechanically limits entry or access to, or operation of, a physical resource. In the illustrated example, the recipient 152 uses the electronic key to gain entry to a vehicle and start the ignition of the vehicle. The electronic device 122 communicates with a key management system 160 over a network 162 to open the lock 158.

The lock 158 may be attached to, be controlled by, or include control logic (implemented as hardware, software, or a combination thereof) that determines when the lock 158 should be unlocked. For example, the lock 158 may determine whether a received code is valid to open the lock 158 (e.g., whether the code matches a predetermined code). Mechanical locking mechanisms may be manipulated by electronics that operate responsive to outputs from the control logic.

The lock 158 may include one or more mechanisms for communicating with persons and other devices. The input mechanisms may include, one or more of, for example, a camera, a microphone, a keypad, a touchpad, a touchscreen, a proximity sensor, an infrared receiver, an ultrasound receiver (e.g., a microphone), a fingerprint scanner, an iris scanner, a retina scanner, an RFID reader, a bar code reader, and a QR code reader. The input mechanisms can also include sensors, antennas, transceivers, and/or other components that enable direct communication with other devices, such as the electronic device 122. For example, the lock 158 may include a camera with which to capture an image of a QR code displayed on the electronic device 122. As another example, the lock 158 may include a Bluetooth module to communicate with the electronic device 122. Modules to permit communication over Wi-Fi, direct wired connections, or other communications channels may additionally or alternatively be included in the lock 158 or electronics associated with the lock 158. The lock 158 may include sensors permitting communication using ultrasound signals, infrared signals, electromagnetic signals, and other data carriers. The lock 158 can include one or more near-field communication (NFC) modules. The lock 158 may include communications modules that permit communication over the network 162.

To use the electronic key, the recipient 152 initiates an unlocking action using the electronic device 122. The unlocking action can be, for example, entry of a user input on a touchscreen or other user interface of the electronic device 122, a tap of the electronic device 122 against the lock 158 (e.g., to enable NFC-based transfer of information from the electronic device 122 to the lock 158), positioning the electronic device 122 near the lock 158 (e.g., to enable the transfer of information from the electronic device 122 to the lock 158 via an IR and/or ultrasonic signal), or another action using the electronic device 122.

In some implementations, the electronic device 122 may store or provide access to multiple different electronic keys. The recipient 152 may select, from among the multiple different keys, a particular electronic key that is needed. As an example, the electronic device 122 may display a list of electronic keys issued to the recipient 152, based on data stored on the electronic device 122 or data received from the key management system 160. The recipient 152 provides user input indicating the particular key that the recipient intends to use, for example, the key to the car owned by Sam, the key issuer. In response, the electronic device 122 performs a process to make the selected key available to be used to unlock the lock 158. As shown, the electronic device 122 may indicate, on a user interface, a visual representation of the electronic key that is being used.

In some implementations, the recipient 152 may unlock the lock 158 without designating a particular electronic key that should be used. When the recipient 152 initiates the unlocking action, the application may determine whether the recipient 152 has been issued an electronic key that opens the lock 158. When the application determines that an appropriate electronic key has been issued, the application may select the electronic key and automatically use the electronic key to unlock the lock 158, without receiving user input that selects the electronic key.

As an example, as a result of the unlocking action, the electronic device 122 may receive an identifier for the lock 158 through communication with the lock 158. The electronic device 122 and/or the key management system 160 may compare the lock identifier with lock identifiers stored in key data for the various electronic keys issued to the recipient. The electronic device 122 and/or the key management system 160 may determine that a lock identifier in key data for a particular electronic key matches the lock identifier for the lock 158. In response, the electronic device 122 and/or the key management system 160 engage in an unlocking process using the particular electronic key. In this manner, the electronic device 122 and/or key management system 160 may automatically select the electronic key corresponding to any of multiple different locks when the recipient 152 performs an unlocking action.

After the recipient 154 performs the unlocking action, the electronic device 122 detects the unlocking action and sends use data 164 indicating the attempted use of the electronic key to the key management system 160. The use data 164 identifies the electronic key and includes description information about the attempted use. For example, the electronic device 122 may send an identifier for the electronic key. In addition, or as an alternative, the electronic device 122 may send data that permits the electronic key to be identified, such information identifying the recipient 152 (e.g., a phone number, username, or electronic address for the recipient 152) and data identifying the lock 158 or the resource 156.

The description information included in the use data 164 can indicate various aspects of the circumstances or context of the attempted use. The description information can enable the key management server to determine whether one or more conditions on use of the electronic key are satisfied. Examples of description information include, for example, a time of the attempted use, information about persons accompanying the recipient 152, and information about the current state of the lock 158 or the resource 156.

In some implementations, the computing device 154 selects the description information to send based on the conditions on the electronic key being used. The description information can include information relevant to determining whether the conditions are met. In the illustrated example, the conditions on use of the electronic key require the recipient 152 to have a driver's license. Accordingly, the electronic device 122 may include in the description information evidence that the recipient 152 has a driver's license, for example, by sending a driver's license number, a photograph of the driver's license, or a code extracted from the physical license. Such information about the recipient's driver's license may be stored within or otherwise accessible via the electronic device 122. For example, a credential management application that stores or otherwise makes accessible information about various credentials that have been issued to the recipient 152, including, for example, a driver's license, may be executing on the electronic device 122. In such cases, information about the recipient's driver's license may be accessed from or by the credential management application. In some implementations, the key management application and the credential management application may be the same or components of a single application.

The key management system 160 receives the use data 164 over the network 162, and determines whether the attempted use described by the use data 164 satisfies the one or more conditions for the electronic key. In the illustrated example, the key management system 160 determines that the recipient 152 has a driver's license, for example, by looking up the recipient's license status in a database. The key management system 160 also determines that the electronic key has not expired, for example, by comparing the time of the attempted use with the expiration data specified by the conditions.

The key management system 160 determines that the conditions on use of the electronic key are satisfied. In response, the key management system 160 provides an access code 166 capable of unlocking the lock. The access code 166 can be provided to the electronic device 122 over the network 162. The electronic device 122 then provides the access code 166 to the lock 158. The lock 158 determines that the access code 166 is valid and the lock 158 opens to permit access to the resource 156. In some implementations, the key management system 160 provides the access code 166 to the lock 158 in addition to, or instead of, access data stored on the electronic device 122 before the attempt to use the electronic key.

The access code 166 may be transmitted as, for example, a numeric code, a text sequence, or data encoded in another form. For example, the access code 166 may be provided to the electronic device 122 encoded as data that describes an image of a Quick Response (QR) code, a bar code, or another image. The electronic device 122 may display the image, and a scanner on the lock 158 may read the image to obtain the access code 166. As another example, the access code 166 can be provided to the computing device 154 as data that describes a signal, such as a radio-frequency signal, infrared signal, or an ultrasonic signal. The electronic device 122 can output the signal to the lock 158 to transmit the access code 166, for example, using near-field communication (NFC) techniques, an electromagnetic radiation source, and/or a loudspeaker.

In some implementations, as described further below, the key management system 160 provides the access code to the lock 158 over the network 162. In this manner, the key management system 160 may open the lock 158 directly, without relaying the access code 166 to the electronic device 122. Further, the lock 158 may detect the unlocking action of the recipient 152, and the lock 158 may transmit use data to the key management system 160 in response to detecting the unlocking action. Use data from the lock 158 may be used by the key management system 160 in addition to, or instead of, the use data 164 from the electronic device 122.

In some implementations, the conditions imposed on an electronic key may be enforced by logic executing on the electronic device 122. For example, the electronic device 122 may determine whether conditions on use of the electronic key are satisfied, and may prevent the electronic key from being used if the electronic device determines that the conditions are not satisfied, or if the electronic device 122 cannot determine that the conditions are satisfied. When the electronic device 122 does not determine the conditions to be satisfied, the electronic device 122 may, for example, exclude the electronic key from being included in a list of electronic keys accessible by the recipient 152, prevent transmission of an access code to the lock 158, and/or indicate to the recipient 152 that access to the lock 158 or use of the electronic key is denied.

In some implementations, during an unlocking sequence involving an electronic key, the key management system 160 and the electronic device 122 each determine whether one or more conditions on the electronic key are satisfied. For example, the key management system 160 and the electronic device 122 may determine whether different conditions are satisfied. In addition, or as an alternative, the lock 158 may determine whether one or more conditions on use of the electronic key are satisfied. Unlocking may be disallowed when any of the key management system 160, the electronic device 122, and the lock 158 determine that any condition on use of the electronic key is not satisfied.

Figure 2A:
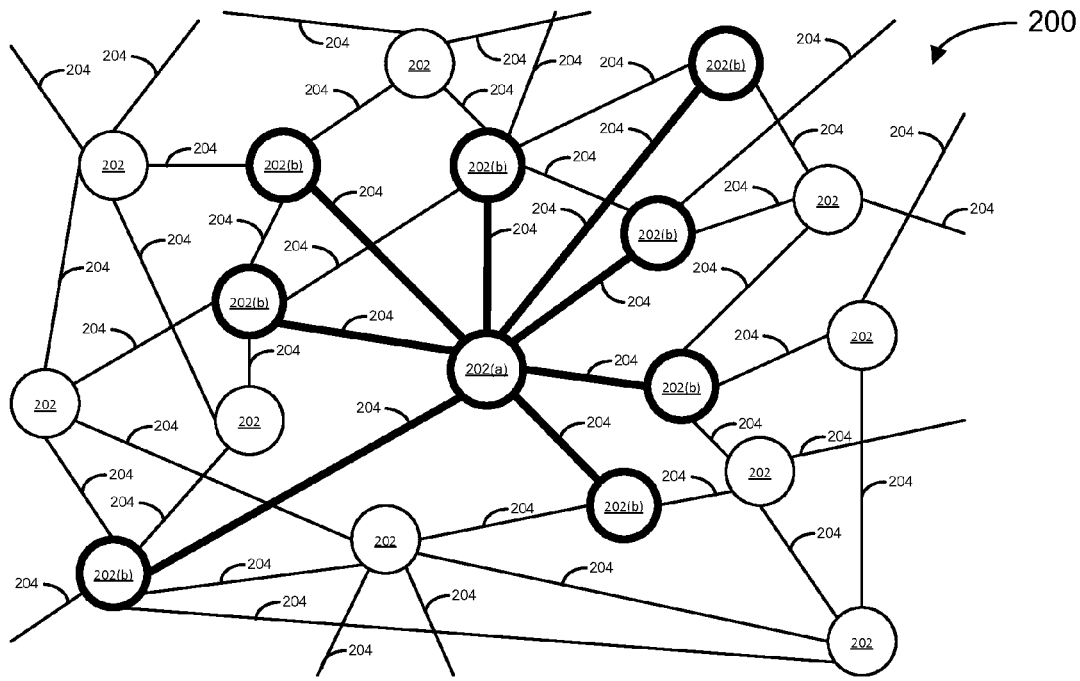
FIGS. 2A and 2B are schematic diagrams illustrating examples of electronic social networking platforms.

FIG. 2A illustrates an example of an electronic social networking platform. As illustrated in FIG. 2A, the electronic social networking platform is represented as a graph 200 of nodes 202 connected by edges 204. In some implementations, each node 202 of graph 200 represents an individual user identity of the electronic social networking platform. In such implementations, an edge 204 that connects two nodes 202 represents a connection that has been formed between the two user identities that are represented by the connected nodes 202. For example, the edges 204 that connect node 202(a) to nodes 202(b) represent connections that have been formed within the electronic social networking platform between the user identity represented by node 202(a) and the other user identities represented by nodes 202(b).

There are many different examples of electronic social networking platforms. As described above, Facebook, Twitter, LinkedIn, Google+, MySpace, and Orkut are a few examples. But, there are many others, and it is reasonable to expect many more to be developed in the future.

Electronic social networking platforms frequently enable individual user identities (e.g., users who have registered with a platform and/or who have been assigned a unique or otherwise identifying identifier by the platform) to establish connections with other user identities. These connections between user identities may reflect relationships between the underlying human users who correspond to the user identities. For example, a connection between two user identities within an electronic social networking platform may reflect a social friendship (e.g., developed through physical interaction in the real-world and/or through on-line interaction in the cyber-world) or a professional relationship between the underlying human users who correspond to the user identities.

In some electronic social networking platforms, a user identity may be able to unilaterally form a connection with another user identity. For example, an electronic social networking platform may enable a first user identity to form a connection to a second user identity simply by specifying a desire to form a connection to the second user identity and without requiring approval of the connection by the second user identity. Alternatively, in other electronic social networking platforms, the formation of connections between two user identities may be a bilateral process. For example, in such electronic social networking platforms, when a first user identity specifies a desire to form a connection to a second user identity, the electronic social networking platform may establish the connection only after the second user identity approves the formation of the connection between the first user identity and the second user identity.

The connections formed between individual user identities within an electronic social networking platform may be represented in the form of a graph, where user identities are represented by nodes and connections between user identities are represented by edges connecting the nodes. Such a graph of interconnected user identities may change dynamically in time as new user identities join and old user identities quit the electronic social networking platform and/or as new connections are formed and old connections are dissolved. Proximity between two user identities of an electronic social networking platform may be measured in terms of degrees of separation between the two user identities. For example, proximity between two user identities of an electronic social networking platform may be calculated as the fewest number of edges required to form a path between the two user identities within the graph representing the connections between user identities of the electronic social networking platform.

A user identity of an electronic social networking platform may form connections to other user identities of the electronic social networking platform, thus forming a personal social network defined within the overall social networking platform. As used herein, the social network of a particular entity refers to the connections and entities for the particular entity, which form a subset of the entities and connections in the broader social networking platform, which encompasses the user identities for all entities and the connections among them. In some cases, the social network of a particular user identity of an electronic social networking platform may be defined as the group of other user identities to whom the particular user identity is directly connected. Alternatively, in other cases, the social network of a particular user identity of an electronic social networking platform may be defined to include a group of other user identities that are within a threshold number of degrees of separation of the particular user identity within the graph.

Electronic social networking platforms commonly facilitate sharing of information and the exchange of electronic communications between user identities and other user identities who are part of their social networks. In some implementations, an electronic social networking platform may allow a particular user identity to access more detailed profile information about the other user identities who are part of the particular user identity's social network than the electronic social networking platform allows the particular user identity to access about user identities who are not part of the particular user identity's social network. For example, an electronic social networking platform may allow a particular user identity to access information that identifies user identities who are part of the particular user identity's social network, but the electronic social networking platform may not allow the particular user identity to access this same information for user identities who are not part of the particular user identity's social network.

Additionally or alternatively, an electronic social networking platform may provide communication conduits between a particular user identity and the other user identities who are part of the particular user identity's social network that the electronic social networking platform does not otherwise provide between the particular user identity and other user identities who are not part of the particular user identity's social network. In some implementations, these communication conduits are used to transfer electronic key information, such as data that enables an electronic key to operate, or data notifying issuers and recipients of electronic keys about the status and usage of the electronic keys.

As discussed above, in some cases, an electronic social networking platform may define a particular user identity's social network as the group of other user identities to whom the user identity is directly connected. If this definition is applied within the electronic social networking platform illustrated in FIG. 2A, the social network for the user identity represented by node 202(*a*) would be defined as the group of other user identities represented by nodes 202(*b*).

In addition to enabling a user identity to establish connections to other user identities and thereby form a social network, some electronic social networking platforms may enable a particular user identity to divide the user identity's social network into one or more subsets of user identities who may, for example, share one or more characteristics of significance to the particular user identity. For example, a particular user identity of an electronic social networking platform may wish to define subsets of user identities within the particular user identity's social network that reflect other user identities with whom the particular user identity has a familial relationship, a professional relationship, or a social relationship. For ease of reference, such defined subsets of a particular user's social network may be referred to herein as "Friendlists."

In some implementations, a user that issues an electronic key may select a Friendlist in order to issue the electronic key to each of multiple other users in the Friendlist. As an example, a user may interact with a user interface element representing a Frendlist for family members to designate all of the user identities in the "family members" Friendlist to receive a particular electronic key.

In some implementations, the key management system uses social network data to determine that a key issuer and key recipient have a particular relationship in the social networking platform. For example, each time a key recipient attempts to use an electronic key, the key management system may access data from the social networking platform to determine whether the key recipient and the key issuer currently have a required relationship, such as a relationship that was in effect when the electronic key was issued. In some implementations, if the connection between the key issuer and the key recipient in the social networking platform is severed or altered, the electronic key may be automatically revoked or disabled. Data indicating connections in the social networking platform can also be used to determine whether conditions on an electronic key are satisfied. As another example, a condition may require the key recipient to be designated in the social networking platform as one of a particular subset of the key issuer's friends in order to use an electronic key.

In addition to enabling user identities to establish connections to other user identities, some electronic social networking platforms enable user identities to establish connections with other types of objects, such as locations and events. For example, some social networking platforms may enable user identities to record information about their hometowns, current places of residence, or places they have visited (including geographic locations (e.g., such as cities, states, or countries) as well as commercial venues, local businesses, or places (e.g., such as restaurants, retail stores, parks, train or bus stations, airports, etc.)) by establishing connections to location objects within the electronic social networking platforms. In some implementations, connections with various objects can be used by a key management system (such as the key management system 160 of FIG. 1E) to evaluate whether one or more conditions on use of an electronic key are satisfied. As an example, a condition on an electronic key may permit use of the electronic key only while the recipient resides in a particular city. The key management system may obtain data about a connection indicating the residence of the recipient when use of the electronic key is attempted to determine whether the residence location satisfies the condition.

Furthermore, some social networking platforms may enable user identities to establish connections with independent applications that leverage the social networking platforms, for example, by granting the independent applications authorization to access or extract data from the electronic social networking platform on their behalf. In some implementations, users access key management functionality provided by an application that communicates with the social networking platform but that is distinct from the social networking platform. For example, the application may be web-based, or may run locally on a client electronic device and be supported by an application server or other system (e.g., a computing system that is not part of the social networking platform and is operated independently from the social networking platform). With authorization from users, the key management system access data from the social networking platform to enable key management functionality for the users.

Figure 2B:
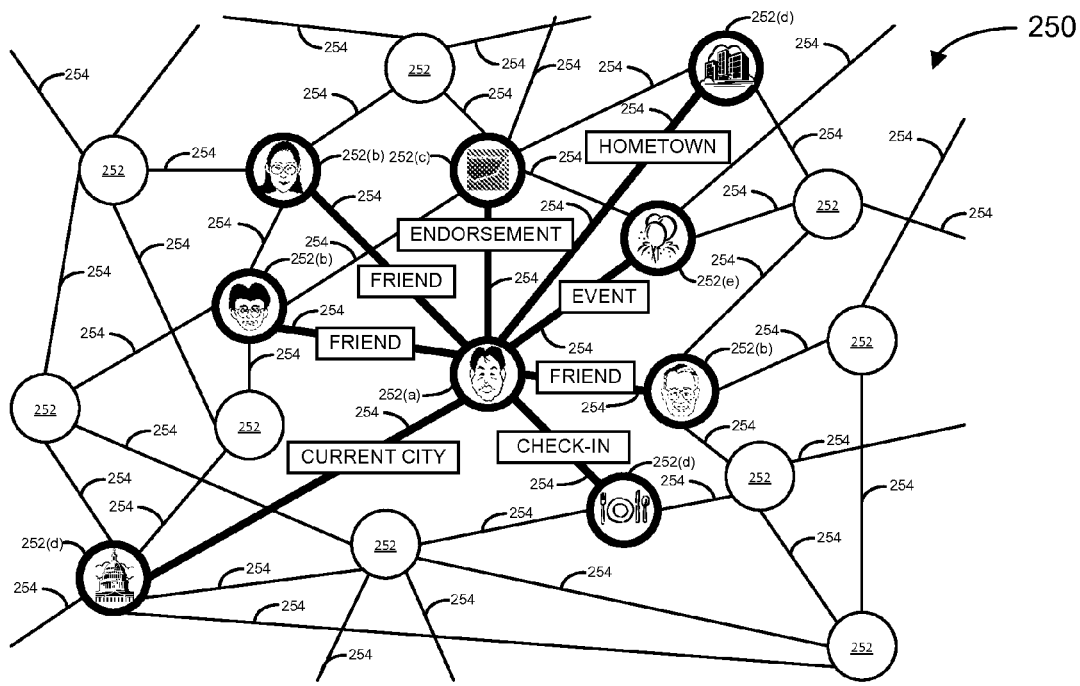

FIG. 2B illustrates an example of an electronic social networking platform. The example of FIG. 2B illustrates a social networking platform that enables user identities to form connections with multiple different types of objects including, for example, other user identity objects, location objects, event objects, and interest objects. As illustrated in FIG. 2B, the electronic social networking platform is represented as a graph 250 of nodes 252 connected by edges 254. Each node 252 in the graph 250 represents a particular type of object in the electronic social networking platform. For example, nodes 252(a) and 252(b) represent user identity objects, while node 252(c) represents an interest object, nodes 252(d) represent location objects, and node 252(e) represents an event object.

An edge 254 that connects two nodes 252 represents a connection that has been formed between the two objects that are represented by the connected nodes 252. For example, the edges 254 that connect node 252(a) to nodes 252(b) represent connections that have been formed between the user identity represented by node 202(a) and the user identities represented by nodes 252(b). (For ease of reference, such a connection between two user identity objects in an electronic social networking platform may be referred to herein as a "friend" connection.) Similarly, the edge 254 that connects node 252(a) to node 252(c) represents a connection, such an endorsement, between the user identity represented by node 252(a) and the interest object represented by node 252(c). The edge 254 that connects node 252(a) to node 252(e) represents a connection that has been formed between the user identity represented by node 252(a) and the event represented by event object node 252(e).

Furthermore, the edges 254 that connect node 252(a) to nodes 252(d) represent connections that have been formed between the user identity represented by node 252(a) and the location objects represented by nodes 252(d). Depending on the electronic social networking platform, a user identity may be able to establish various different types of connections to location objects. For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" connection to a location object that represents the user identity's current residence.

Moreover, in order to store a record of a place the user identity visited (including geographic locations (e.g., such as cities, states, or countries) as well as commercial venues, local businesses or places (e.g., such as restaurants, retail stores, parks, train or bus stations, airports, etc.)), the user identity may establish what may be referred to herein as a "check-in" connection to a location object that represents a place that the user identity visited. In some cases, an electronic social networking platform may provide mechanisms that enable a user identity to manually "check-in" at a location. For instance, a social networking platform may provide mechanisms that enable a user identity to "check-in" at a location using a mobile computing device (e.g., a smartphone or tablet computer) using global positioning system (GPS) and/or map data available to the mobile computing device. As with other data stored by a social networking platform, "check-in" records can be accessed by key management systems to validate the use of an electronic key in accordance with the corresponding conditions on use of the electronic key, if any have been imposed.

Electronic social networking platforms often enable user identities to maintain user profiles or other collections of data that include information about the user identities to whom they correspond. Such a profile for an individual user identity of an electronic social networking platform may include, among other information, information about the user identity's hometown, current residence, age, gender, relationship status, educational background, and/or professional background. The key management system may use profile data (e.g., a name, a photograph, etc.) to identify potential recipients for an electronic key, assisting key issuers to select appropriate recipients. Similarly, the key management system may provide profile data of key issuers to key recipients, assisting the key recipients to identify the user identities that issued the received keys. In addition, the key management system can use profile data to determine whether conditions on an electronic key are satisfied. As an example, a condition may require the key recipient to be a member of a particular community organization, be above a particular age, or have a particular educational background to use an electronic key. In some implementations, the key management system obtains social networking profile data for the key recipient and evaluates the profile data to determine whether the condition is satisfied.

In some implementations, a profile for a user identity may include one or more phone numbers, electronic communication addresses (e.g., electronic mail addresses, Twitter feed address, etc.), or other identifiers. The key management system can obtain one or more electronic addresses or other identifiers from the profile of a key issuer or key recipient to communicate regarding an electronic key. For example, the key management system may access an electronic address from a key recipient's profile, and send to the electronic address a notification of transfer of an electronic key, an access code that opens the corresponding lock, and/or other data that enables the recipient to use the electronic key. As another example, the key management system may access an electronic address from a key issuer's profile, and may send to the electronic address access data requesting the key issuer's approval for use or transfer an electronic key issued by the key issuer.

Figure 3:
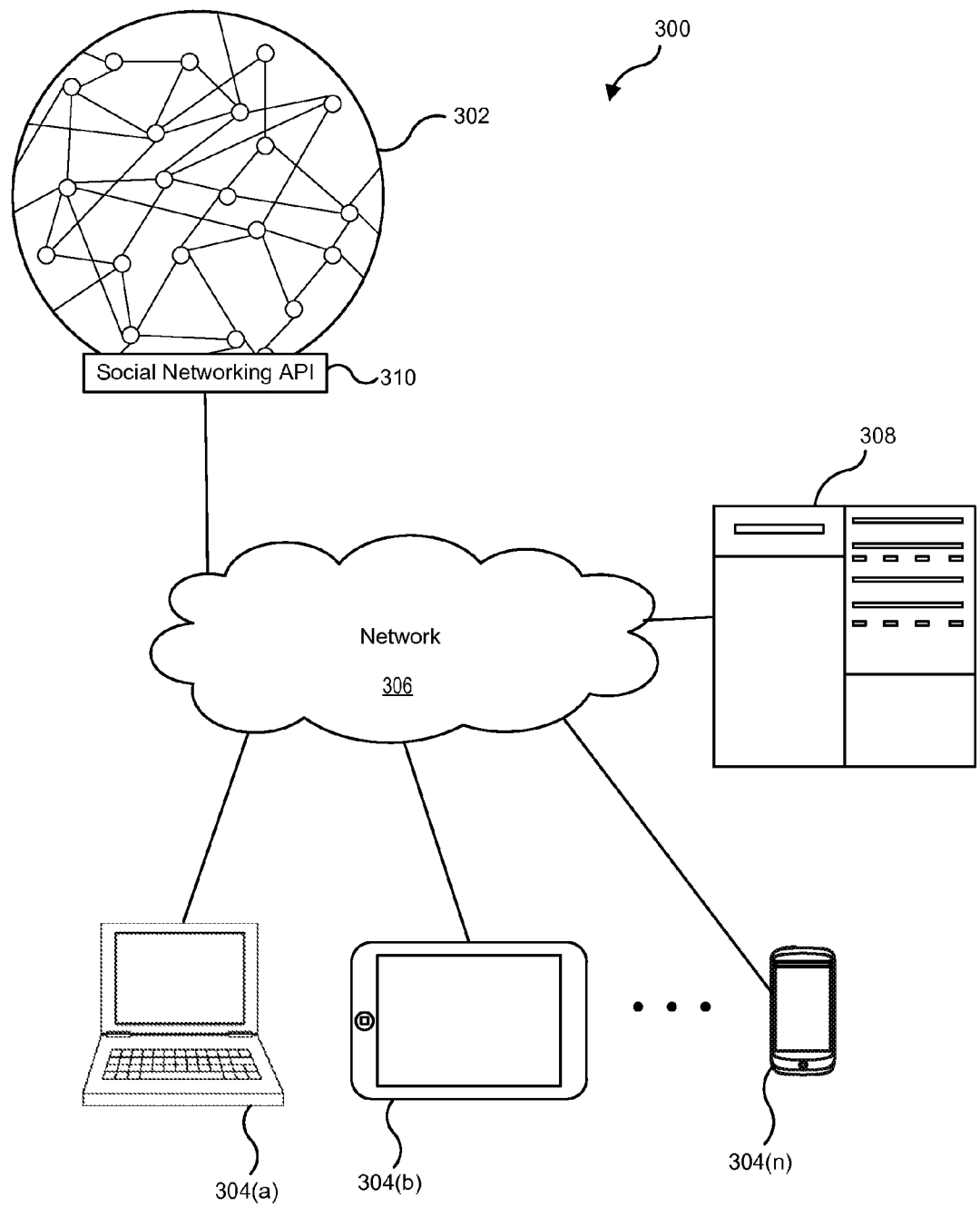
FIG. 3 is a block diagram illustrating an example of a communications system.

FIG. 3 illustrates an example of a communications system 300. For illustrative purposes, several elements illustrated in FIG. 3 and described below are represented as monolithic entities. However, these elements each may include and/or be implemented on numerous interconnected computing devices and other components that are designed to perform a set of specified operations.

As illustrated in FIG. 3, the communications system 300 includes an electronic social networking platform 302 that is accessible to a number of computing devices or other electronic devices 304(a)-304(n), including, for example, a laptop computer 304(a), a tablet computer 304(b), and a smartphone 304(n), over a network 306. In addition, the communications system 300 also includes a computing system 308. The computing system 308 may be external to the electronic social networking platform 302. As such, the electronic social networking platform 302 may be accessible to the computing system 308 over the network 306. Additionally, the computing system 308 may be accessible to the electronic devices 304(a)-304(n) over the network 306.

The electronic social networking platform 302 may be implemented using one or more computing devices (e.g., servers) configured to provide a service to one or more client devices (e.g., electronic devices 304(a)-304(n)) connected to electronic social networking platform 302 over network 306. The one or more computing devices on which electronic social networking platform 302 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 302. Furthermore, the one or more computing devices on which the electronic social networking platform 302 is implemented each may include one or more processors for executing instructions stored in storage and/or received from one or more other electronic devices, for example over the network 306. In addition, these computing devices also typically may include network interfaces and communication devices for sending and receiving data. The electronic social networking platform 302 also may provide an application programming interface (API) 310 that enables other applications to interact with and extract data from the electronic social networking platform 302.

The electronic devices 304(a)-304(n) may be any of a number of different types of computing devices including, for example, mobile phones; smartphones; personal digital assistants; navigation devices; laptop, tablet, and netbook computers; wearable computers; and desktop computers including personal computers, special purpose computers, general purpose computers, and/or combinations of special purpose and general purpose computers. Each of the electronic devices 304(a)-304(n) typically may have internal or external storage components for storing data and programs such as an operating system and one or more application programs. In particular, the internal or external storage components for each of the electronic devices 304(a)-304(n) may store a client application for interfacing with the electronic social networking platform 302 and/or a client application for interfacing with the computing system 308. Additionally or alternatively, the electronic devices 304(a)-304(n) may be configured to interface with the electronic social networking platform 302 or the computing system 308 without a specific client application, using, for example, a web browser.

Each of the electronic devices 304(a)-304(n) also typically may include a central processing unit (CPU) for executing instructions stored in storage and/or received from one or more other electronic devices, for example over the network 306. Each of the electronic devices 304(a)-304(n) also usually may include one or more communication devices for sending and receiving data. One example of such communications devices is a modem. Other examples include antennas, transceivers, communications cards, and other network adapters capable of transmitting and receiving data over a network (e.g., the network 306) through a wired or wireless data pathway.

The network 306 may provide direct or indirect communication links between the electronic social networking platform 302, the electronic devices 304(a)-304(n), and the computing system 308. Examples of the network 306 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

The computing system 308 may be implemented using one or more computing devices (e.g., servers). The one or more computing devices on which computing system 308 is implemented may have internal or external storage components storing data and programs such as an operating system and one or more application programs. The one or more application programs may be implemented as instructions that are stored in the storage components and that, when executed, cause the one or more computing devices to provide the features ascribed herein to the computing system 308. Furthermore, the one or more computing devices on which the computing system 308 is implemented each may include one or more processors for executing instructions stored in storage and/or received from one or more other electronic devices, for example, over the network 306. In addition, these computing devices also typically may include network interfaces and communication devices for sending and receiving data.

The computing system 308 may host an application (e.g., a key management application) that leverages electronic social networking platform 302. As such, the computing system 308 may be configured to extract and process data from electronic social networking platform 302. For example, the computing system 308 may be configured to exploit the API 310 to extract data from the electronic social networking platform 302. Among other features, the computing system 308 may be configured to extract data about multiple different user identities' social networks including information identifying the members of each user identity's social network and profile data for the members of each user identity's social network, including electronic addresses with which to contact the members of the social network.

In some implementations, the electronic social networking platform 302 may enable individual user identities to grant the computing system 308 a token that defines permission levels related to data about the user identities' social networks that computing system 308 may access and extract from electronic social networking platform 302. For each individual user identity for which the computing system 308 has a token, the computing system 308 may extract information about the user identity and the other user identities who are members of the user identity's social network. This information may include identifying information for the user identity and each member of the user identity's social network as well as profile data for the user identity and each member of the user identity's social network (e.g., hometown, current residence, age (or date of birth), gender, relationship status, etc.). In addition, or as an alternative, the computing system 308 may access any other data from the social networking platform, associated with the user identity and each member of the user identity's social network, for which access permission is granted, including communications sent or received, endorsements, and other activities occurring within or described within the social networking platform.

In FIG. 3, the computing system 308 may represent the key management system 160 of FIGS. 1A-1E that receives user input, issues electronic keys, evaluates attempted uses of electronic keys, approves uses that satisfy appropriate conditions, and/or sends access codes that open locks. The electronic devices 304(a)-304(n) may each perform the functions of the electronic devices 102, 122 of FIGS. 1A-1E. That is, any of the electronic devices 304(a)-304(n) may interact with a server system to issue or modify an electronic key, as described for the electronic device 102, 122. Further, any of the electronic devices 304(a)-304(n) may receive electronic key data and access codes to open a lock with an electronic key, as described above for the electronic device 102, 122.

Figure 4:
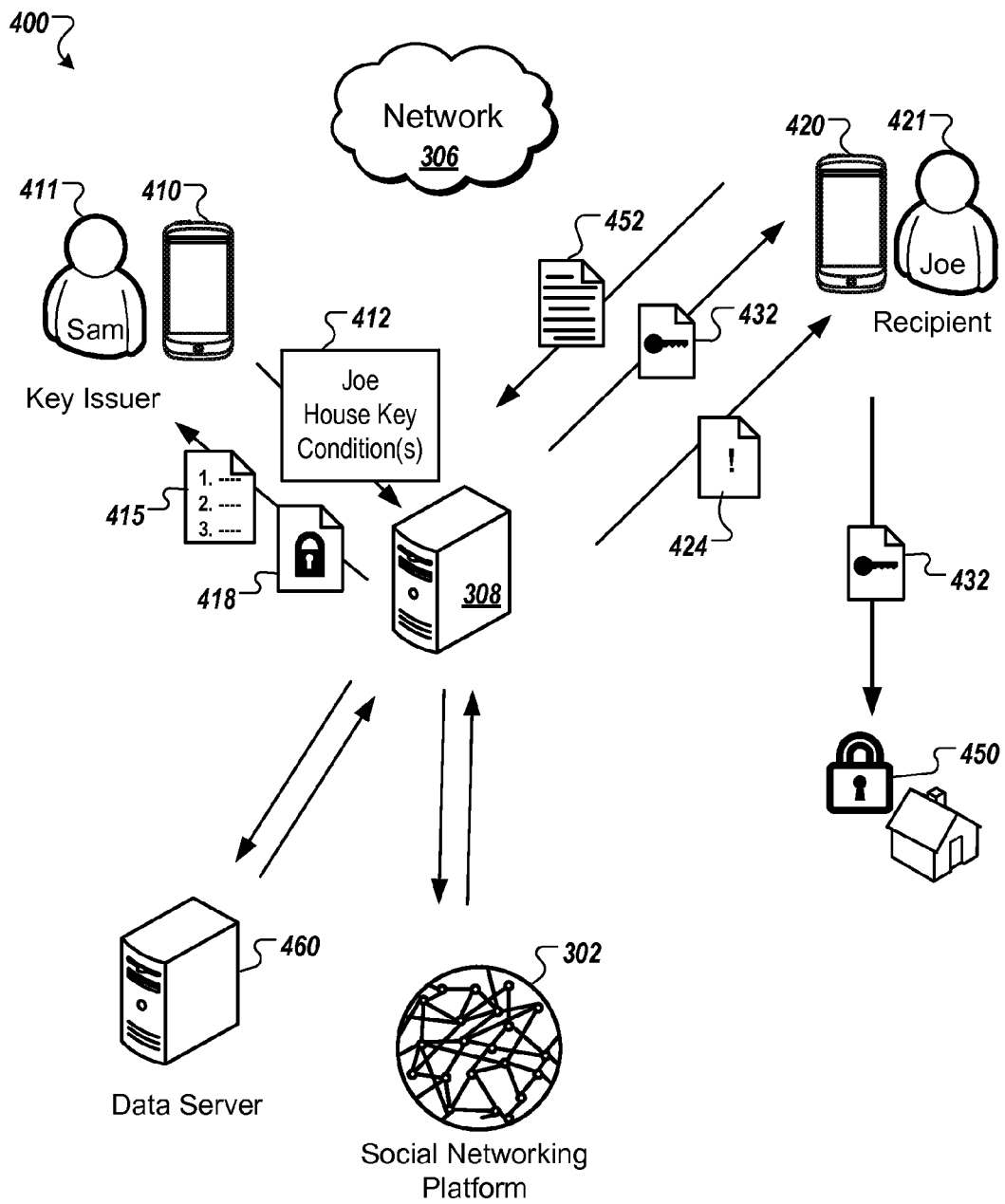
FIG. 4 is a schematic diagram illustrating an example of a system for managing electronic keys.

FIG. 4 illustrates an example of a system 400 for providing an electronic key using a social networking platform. The system 400 includes electronic devices 410, 420, a lock 450, the computing system 308 of FIG. 3, the social networking platform 302 of FIG. 3, and a data server 460, each of which communicates over the network 306 of FIG. 3. The electronic devices 410, 420 can be any type of electronic device, for example, including any of the types of electronic devices 304(a)-304(n) described above. The lock 450 can be a physical lock, such as a lock that secures access to a physical space or secures the function of a physical device, even though the physical lock may function using electrical or software processes.

The electronic device 410 is associated with an issuer 411 of an electronic key. The electronic device 420 is associated with a recipient 421 of the electronic key. In the example of FIG. 4, the issuer 411 uses the electronic device 410 to interact with the computing system 308 and provide an electronic key to the recipient 421. The computing system 308 acts as a key management server by carrying out transfer of the electronic key and storing data that permits the electronic key to operate. Thereafter, the recipient 421 may use the electronic key to open a lock 450 (or multiple different locks).

The issuer 411 may place conditions on use of the electronic key by the recipient 421. When conditions are imposed on the electronic key, the computing system 308 evaluates each attempted use of the electronic key, and permits the lock 450 to open only when the conditions are satisfied. When the conditions for use of the electronic key are not satisfied, the computing system 308 may prevent the lock 450 from opening.

In further detail, the issuer 411 uses the electronic device 410 to issue an electronic key to a user to which the issuer 411 is connected in the social networking platform 302. The electronic device 410 runs an application (e.g., a key management application) that enables the issuer 411 to provide the electronic key, for example, through interactions with the computing system 308. In some implementations, a web page or other interface is used to establish an electronic key rather than an application running on the electronic device 410.

In some implementations, the issuer 411 may use any of multiple different electronic devices to manage electronic keys. For example, the issuer 411 may access the application through a mobile phone, desktop computer, tablet computer, and/or other electronic device by interacting with the application through the devices.

The computing system 308 provides data to support the application running on the electronic device 410. As illustrated in FIG. 4, the computing system 308 is a third-party system separate from the social networking platform 302. In some implementations, the computing system 308 is part of the social networking platform 302.

The computing system 308 may extract information about the social networking connections of the issuer 411 in the social networking platform 302. The computing system 308 may provide the extracted social network data 415 to the electronic device 410. For example, the social network data 415 may identify users who are connected to the issuer 411 in the social networking platform 302.

The computing system 308 may provide data identifying locks for which the issuer 411 has authority to extend access permissions to others. In some implementations, the computing system 308 maintains records identifying locks controlled by various different users. For example, users may register locks with the computing system 308 and may validate ownership of or another form of right to control a particular lock.

In the example of FIG. 4, the electronic device 410 receives the social network data 415 from the computing system 308 and also receives lock data 418 that identifies locks controlled by the issuer 411. The electronic device 410 displays a list of members of the social network of the issuer 411. The electronic device 410 also displays a list of locks controlled by the issuer 411. For example, the electronic device 410 may indicate members of the social network of the issuer 411 and indicate locks controlled by the issuer 411 using a user interface similar to the user interface 100 of FIG. 1A.

The issuer 411 provides user input indicating selection of one or more members of the social network who should receive the electronic key. In some implementations, only users who are connected to the issuer 411 in the social networking platform 302 are permitted to receive the electronic key from the issuer 411. In the illustrated example, the recipient 421 is connected to the issuer 411 in the social networking platform 302. When selecting from among the users who are connected to the recipient 421 in the social networking platform 302, the issuer 411 selects the recipient 421 to receive the electronic key.

The issuer 411 also provides user input indicating selection of one or more locks that the electronic key should open. In the example, the issuer 411 indicates that that the electronic key should open the lock 450, which controls entry to the house of the issuer 411.

The application on the electronic device 410 also enables the issuer 411 to impose conditions on use of the electronic key. For example, the electronic device 410 may permit the issuer 411 to select conditions for the electronic key using a user interface similar to the user interface 110 of FIG. 1B. Conditions may be defined to limit use to only a set of approved uses (e.g., designating a "whitelist" of allowed uses). Conditions may additionally or alternatively be defined to allow all uses except a set of excluded uses (e.g., designating a "blacklist" of excluded uses).

Examples of conditions on use of an electronic key include conditions that: (1) limit a time during which the electronic key may be used; (2) require the recipient to possess a particular credential or qualification; (3) require approval from the key issuer for each use of the electronic key; (4) limit a number of times that the electronic key may be used; (5) require the recipient to be accompanied by another person (e.g., a person selected from a defined list of persons, or a person that has a particular qualification); (6) require that, when the electronic key is used, the key issuer must be outside of, or be located beyond a predetermined distance from, a space to which the electronic key provides access; (7) require that, when the electronic key is used, the key issuer must be within, or be located within a predetermined distance from, a space to which the electronic key provides access; and (8)

require the identity of the recipient to be confirmed at the time the electronic key is used (e.g., through a password, a biometric input, or another form of authentication).

Based on the user input from the issuer 411, the electronic device 410 provides, to the computing system 308, data 412 that identifies the recipient 421, the lock 450, and the one or more conditions on use of the electronic key. The computing system 308 receives the data 412 and issues the electronic key as requested by the issuer 411.

Figure 8:
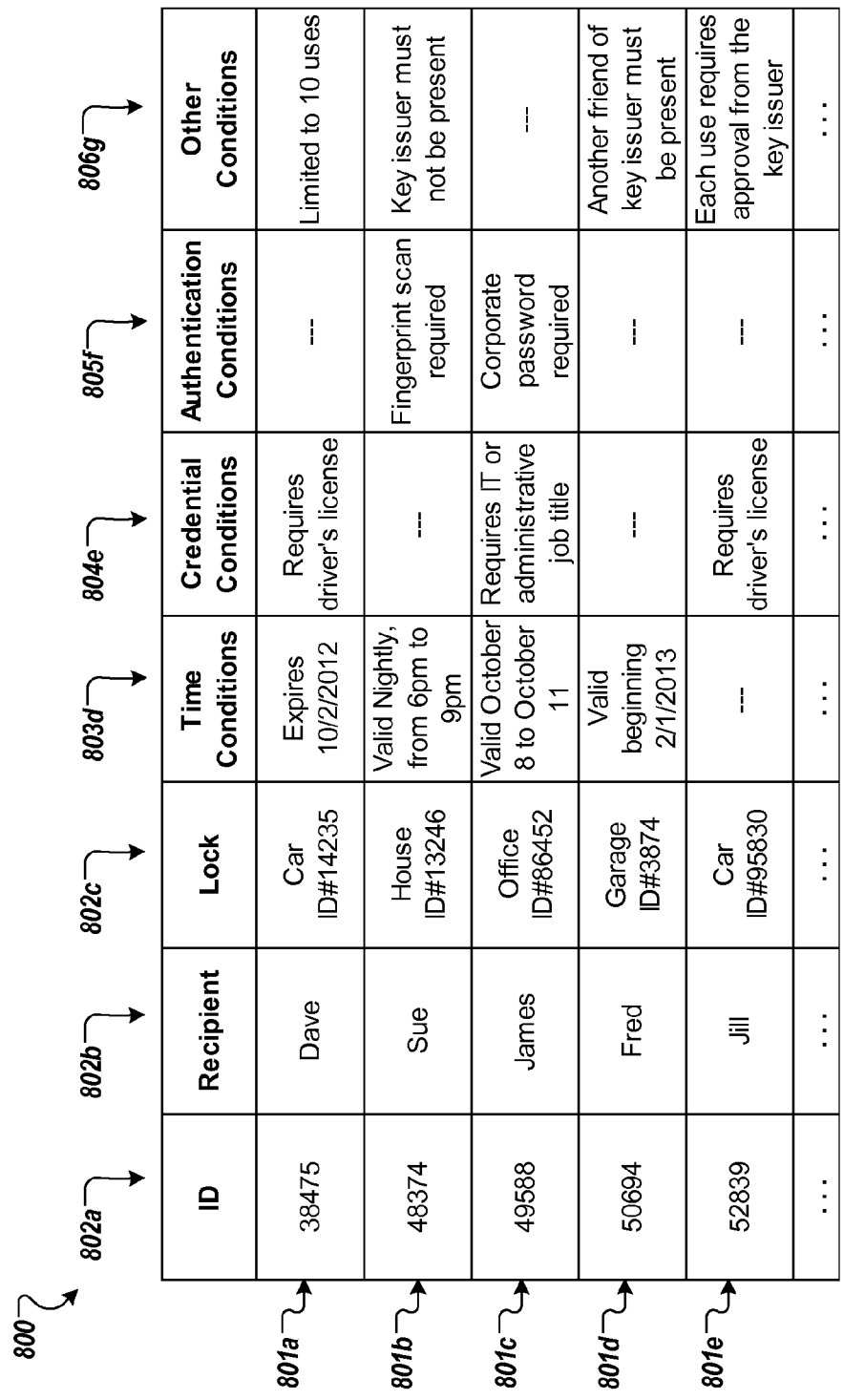
FIG. 8 is a table illustrating example key data.

The computing system 308 stores key data that identifies the recipient 421, the lock 450, the one or more conditions on use of the electronic key. The key data may be stored in electronic storage, such as a database or other data storage system. Various examples of key data are shown in FIG. 8 and described below.

The computing system 308 may also store, in the key data, data that indicates access codes which are effective to open the lock 450 or data from which the access codes may be generated. For example, when the lock 450 is registered with the application and determined to be under the control of the issuer 411, the computing system 308 may obtain a serial number or other lock identifier for the lock 450. Using the lock identifier, the computing system 308 may obtain access data indicating input data, interactions, and or communication formats that may be used to open the lock 450. The access data may be obtained from a manufacturer of the lock, from the electronic device 410, from communication with the lock 450 directly over the network 306 or through another device, or through one or more other devices. As an example, the lock 450 may use encrypted communication, a rolling code scheme, and/or other security measures. In this example, the computing system 308 may store an encryption key, synchronization data for the rolling code scheme, and one or more access codes accepted by the lock 450, which permit the computing system 308 to determine, at any given time, an access code that is effective to open the lock 450.

The computing system 308 obtains an electronic address (e.g., an electronic mail address, a phone number, a social networking username, etc.) for the recipient 421. For example, the computing system 308 may obtain the electronic address from a social networking user profile of the recipient 421 in the social networking platform 302.

The computing system 308 sends notification data 424 to the electronic address for the recipient 421. The notification data 424 indicates that the electronic key has been issued, and may indicate the lock 450 and conditions corresponding to the electronic key. For example, the notification data 424 may be received at the electronic device 420, and the electronic device 420 can display a user interface similar to the user interface 120 of FIG. 1C or user interface 130 of FIG. 1D.

In some implementations, the notification data 424 includes data that enables the recipient to use the electronic key in accordance with the one or more conditions on use of the electronic key. For example, the notification data 424 can include data that the electronic device 420 can use to communicate with the lock 450 and initiate an unlocking sequence. As described further below, additional data from the computing system 308 may be required to complete the unlocking sequence successfully. Each time the electronic key is used to unlock the lock 450, the computing system 308 may provide the additional data only when the computing system 308 determines that the conditions on use of the electronic key are satisfied.

In some implementations, the electronic key is revocable by the issuer 411. For example, the issuer 411 may use the application running on the electronic device 410 to revoke the electronic key at any time. The issuer 411 may temporarily disable the electronic key, for example, causing the electronic key to be unusable by the recipient 421 (e.g., ineffective to open the lock 450) for a specified amount of time or until the issuer 411 re-enables the electronic key. When the electronic key is disabled or revoked, the computing system 308 may transmit, to the electronic address for the recipient 421, data that indicates that the electronic key is not available for use. For example, when the key has been disabled or revoked and the recipient 421 attempts to use the electronic key to open the lock 450, the computing system 308 may indicate that access is denied, and may indicate the status of the electronic key.

After the electronic key has been issued to the recipient 421, the recipient 421 may use the electronic device 420 (or another electronic device) to open the lock 450. In some implementations, the recipient 421 may open the lock using any electronic device running the application that manages electronic keys.

Various interactions can occur among the electronic device 420, the lock 450, the computing system 308, and other systems when opening the lock 450. Different interactions may occur for different electronic keys, for example, when different conditions are imposed on use of the electronic keys, or when different locks are opened. One example of interactions for unlocking the lock 450 is described below with respect to FIG. 4. Other examples of interactions for opening locks are described below with respect to FIGS. 5A-5E.

The electronic device 420 sends, to the computing system 308, use data 452 about the attempted use of the electronic key by the recipient 421. The electronic device 420 may send the use data 452 in response to detecting an action of the user or receiving a communication from another device. For example, transmission of use data may be triggered by: receipt of a user input, such as a user input selecting the electronic key from among a set of electronic keys issued to the recipient 421; detection of a gesture made with the electronic device 420, such as a tap, twist, or shake of the electronic device; and/or receipt of data from the lock 450, such as receiving a lock identifier through direct communication with the lock 450.

The use data 452 includes description information that describes the circumstances in which use of the electronic key is attempted. For example, the use data 452 may indicate an identifier for the recipient 421 and/or the electronic device 420, data obtained from the lock 450 by the electronic device 420 (e.g., via NFC data transfer techniques, IR data transfer, and/or ultrasonic data transfer), data indicating a time of the attempted use, data identifying persons accompanying the recipient, data confirming the identity of the recipient 421, and other data. The use data 452 may further include other data which enables the computing system 308 to determine (e.g., to select or generate) an access code that is effective to open the lock 450.

In response to the use data 452, the computing system 308 accesses the stored key data for the electronic key. From the key data, the computing system 308 determines which conditions have been imposed on the electronic key, if any. The computing system 308 then determines whether the conditions are satisfied by the attempted use described by the use data 452.

The computing system 308 may extract data from the social networking platform 302 and use extracted social network data to determine whether the lock 450 should be opened for the recipient 421. For example, the computing system 308 may access data indicating social networking connections in the social networking platform 302, and determine whether the issuer 411 and the recipient 421 are still connected within the social networking platform. In some implementations, the computing system 308 permits the lock 450 to be opened only when the social networking connection between the issuer 411 and the recipient 421 is still in force within the social networking platform.

The computing system 308 may also use social network data to determine whether one or more conditions on use of the electronic key are satisfied. For example, when a condition for use of the electronic key requires the recipient 421 to be at least a certain age, the computing system 308 may obtain the age of the recipient 421 from social networking profile data of the recipient 421. As another example, a condition for use of the electronic key may require the recipient 421 to be accompanied by a family member. The computing system 308 may determine, based on the social network data, whether a person that accompanies the recipient 421 is designated in the social networking platform 302 as being a family member of the recipient 421. Other social network data may be obtained and evaluated to determine whether conditions are satisfied.

The computing system 308 may communicate with one or more other systems, such as a data server 460, to obtain additional data used to determine whether conditions on use of the electronic key are satisfied. For example, a condition for use of the electronic key may require the recipient 421 to have a valid driver's license. The computing system 308 may provide an identifier for the recipient 421 to the data server 460, and obtain from the data server 460 data indicating whether or not the recipient 421 has a valid driver's license.

The computing system 308 may communicate with the electronic device 410 to determine whether conditions on use of the electronic key are satisfied. For example, a condition for use of the electronic key may require approval of each use of the electronic key by the issuer 411. The computing system 308 may send a request to the electronic device 410 (e.g., to an electronic address or account for the issuer 411) requesting approval for the attempted use of the electronic key. After the issuer 411 provides input indicating whether the attempted use is approved, the electronic device 410 sends, to the computing system 308, data indicating the approval or denial of authorization of the particular instance of use of the electronic key attempted by the recipient 421.

The computing system 308 evaluates the use data 452 against the key data. The computing system 308 compares the information about the attempted use of the electronic key with the one or more conditions designated for the electronic key by the issuer 411. In some implementations, the computing system 308 uses extracted social network data, data from the electronic device 410, and data from other systems such as the data server 460 to evaluate the attempted use of the electronic key and determine whether the conditions are satisfied.

In the illustrated example, the computing system 308 determines that the attempted use of the electronic key satisfies the associated conditions. As a result, the computing system 308 selects an access code 432 that will open the lock 450. To select the access code 432, the computing system 308 may, for example, select a particular code from among a set of codes used in a rolling code scheme. The computing system 308 may store or obtain data to synchronize access code usage in the rolling code scheme with the lock 450. Additionally or alternatively, the computing system 308 may generate, as the access code, an encrypted message using encryption decodable by the lock 450. In some implementations, the access code may be valid only for a defined period of time.

In some implementations, the computing system 308 encodes the access code 432 in a QR code, a bar code, an image, or in another form. The access code 432 is provided to the electronic device 122 in the encoded form. The electronic device 420 then provides the access code 432 to the lock 450. In some implementations, the lock 450 includes a scanner or reader that can read a QR code, bar code, or other data displayed on the electronic device 420. The electronic device 420 displays an image encoding the access code 432, and the lock 450 reads the access code 432 from the displayed image. In some implementations, the electronic device 420 provides the access code to the lock 450 through a WiFi connection, a Bluetooth connection, a wired connection, or another means of communication. The electronic device 420 may provide the access code to the lock 450 through near field communication (NFC) techniques, infrared transmission, radio-frequency transmission, ultrasonic transmission, or other outputs of the electronic device 420.

The lock 450 obtains the access code 432 from the electronic device 420, and the lock 450 evaluates the access code 432. The lock 450 determines that the access code 432 is valid, and the lock 450 opens in response. In some implementations, as discussed below, the lock 450 receives the access code 432 from the computing system 308 over the network 306 rather than through communication with the electronic device 420.

If the computing system 308 determines that the conditions on use of the electronic key are not satisfied, or if the computing system 308 cannot verify that the conditions are satisfied, the computing system 308 does not send the access code 432. Instead, the computing system 308 may send a message indicating that the access to the lock 450 is denied. Without the access code 432, the recipient 421 is unable to open the lock 450. To open the lock 450, the recipient 421 may be required to initiate the unlocking process again, in a manner that satisfies the conditions imposed on the electronic key.

In some implementations, the computing system 308 identifies the electronic device 420 and transmits the access code 432 in response to determining that the electronic device 420 is associated with the recipient 421. For example, the use data 452 may include a device identifier for the electronic device 420, such as a phone number for a mobile phone, device serial number, media access control (MAC) address. The computing system 308 compares the received device identifier with one or more stored device identifiers that have been registered with the application or the social networking platform 302. The computing system 308 provides the access code 432 to unlock the lock 450 only when the electronic device 420 is one of a set of devices registered as associated with the recipient 421. In this manner, the recipient's mobile phone, watch, music player, etc., may each act as a key to open any of the locks for which the recipient 421 has been issued an electronic key.

In some implementations, the computing system 308 transmits the access code 432 in response to verifying that the electronic device 420 is controlled by the recipient 421, in addition to or as an alternative to determining that the electronic device 420 is associated with the recipient 421. For example, the recipient 421 may be required to provide a password for the application or the social networking platform 302, and the password may be transmitted in the use data 452. An electronic cookie or session identifier may be provided to indicate that the recipient 421 is logged in to the application or the social networking platform 302. In addition, or as an alternative, the electronic device 420 or the lock 450 may acquire biometric information from the recipient 421, for example, through a fingerprint scan, a retina scan, an iris scan, voice analysis, handwriting analysis, a facial photograph, or other techniques. With a password or biometric input, the recipient 421 may be authenticated and be permitted to use the electronic key using any suitable electronic device, not only electronic devices previously registered with the application or the social networking platform 302.

Multi-factor authentication may be used to verify that the recipient 421 to which the electronic key is issued is the person opening the lock 450. The computing system 308 may require a combination of at least two different forms of authentication, such as a password and a fingerprint scan, or the use of a registered electronic device 420 and a password. The two or more forms of authentication can be selected from among biometric data, other user inputs or interactions (such as passwords or answers to security questions), and device identifiers. Authentication requirements, for recipients of electronic keys or for associated electronic devices, may be implemented as conditions on particular keys or as general conditions for all electronic keys.

The same authentication procedures used to authenticate the recipient 421 may be used to authenticate a person accompanying the recipient 421. For example, when a condition requires that a designated person accompany the recipient 421 in order for the electronic key to be used, the designated person can be authenticated through a device identifier (e.g., indicating the presence of the designated person's mobile phone or other device), a user input (e.g., a password for the designated person's social networking user identity in the social networking platform 302), or biometric data for the designated person.

Authentication data (e.g., user input, fingerprint scan data, device identifiers, etc.) that indicates the presence of a companion may be communicated to the computing system 308 in various ways. Authentication data for the companion may be entered into the electronic device 420 by the companion, and the authentication data may be transmitted to the computing system 308 by the electronic device 420. In addition, or as an alternative, the authentication data for the companion may be entered by the companion into a device different from the electronic device 420, such as the companion's mobile phone or another device associated with the companion. The authentication data may be transmitted from the companion's mobile phone to the computing system 308 over the network 162 (e.g., and not through the electronic device 420). In addition, or as an alternative, authentication data may be transmitted from the companion's mobile phone or other electronic device to the electronic device 420, and the electronic device 420 may send the authentication data to the computing system 308. The companion's mobile phone or other electronic device may communicate with the electronic device 420 using near-field communication techniques, infrared transmissions, ultrasonic transmissions, Bluetooth, and/or other communication channels.

In addition, or as an alternative, authentication data for the companion may be entered into the lock 450 (e.g., through a fingerprint scanner of the lock 450, a microphone of the lock, a keypad of the lock, etc.), and the lock 450 may transmit the authentication data to the computing system 308 over the network 306, without the authentication data being relayed through the electronic device 420 or the companion's mobile phone or other electronic device.

In some implementations, rather than the computing system 308 sending an access code 432, the computing system 308 sends data that indicates approval for the electronic device 420 to provide to the lock 450 an access code that was stored on the electronic device 420 before the use data 452 was sent. In such implementations, the use data 452 may be a request for authorization to use (e.g., transmit to the lock 450) one or more access codes already stored on the electronic device 420. For example, one or more access codes that open the lock 450 (or data from which the electronic device 420 may generate such access codes) may have been downloaded to the electronic device 420 previously, such as when the recipient 421 was first notified that the electronic key was issued. The application that manages electronic keys, running on the electronic device 420, may limit use of the stored access codes, disallowing transmission of the access codes to the lock 450 unless approval is received from the computing system 308 for each attempt to open the lock 450.

Figure 5A:
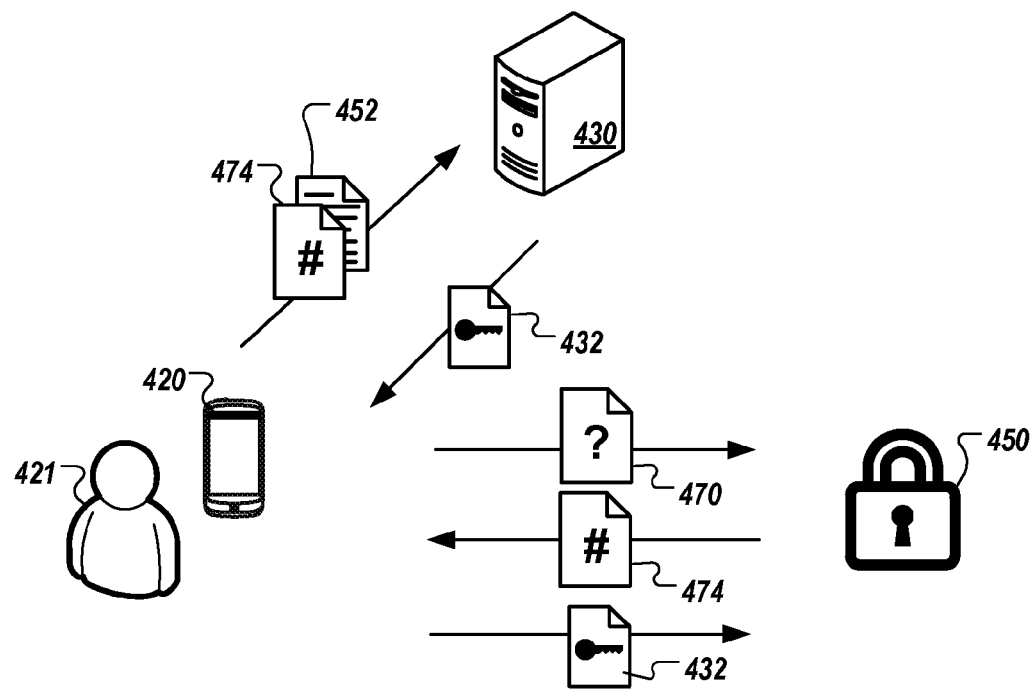
FIGS. 5A-5E are schematic diagrams illustrating examples of techniques for using electronic keys.

FIG. 5A illustrates another example of interactions that open the lock 450. In the example, the recipient 421 performs an unlocking action with the electronic device 420. The unlocking action can be achieved by a tap of the electronic device 420 against the lock 450 or by otherwise initiating near-field communication between the electronic device 420 and the lock 450. Additionally or alternatively, the unlocking action can be achieved by other data transfer mechanisms between the electronic device 420 and the lock 450, including, for example, IR data transfer or ultrasonic data transfer. Irrespective of the data transfer mechanism employed, the electronic device 420 may send a request or other message 470 to the lock 450. The lock 450 may have, or be associated with, various different sensors that enable various different forms of communication between the electronic device 420 and the lock 450 (e.g., a NFC sensor, an IR sensor, a microphone for ultrasonic data transfer, a camera, etc.).

The lock 450 responds to the message 470 by sending a lock code 474. In some implementations, the lock 450 provides different lock codes 474 at different times, for example, using a rolling code system. In some implementations, the lock code 474 includes data that uniquely identifies the lock 450.

In some implementations, use of the electronic key is permitted only when the recipient 421 is in proximity of the lock 450 (e.g., when the recipient 421 is within a threshold distance of the lock 450). To enforce the proximity requirement, the computing system 308 can require the lock code 474 to be obtained from the lock 450, at the physical location or site of the lock 450, at the time the use of the electronic key is attempted. Since various different lock codes 474 can be used by a single lock 450, the electronic device 420 must obtain the lock code 474 that is current at the time that use of the electronic key is attempted. The lock code 474 may be obtainable only through short-range communication with the lock 450 that requires proximity to the lock 450 (e.g., communication via radio-frequency electromagnetic waves, infrared, ultrasonic waves, visible light, etc.). As a result, the electronic device 420 obtains the lock code 474 only when at least a minimum proximity to the lock 450 has been achieved (e.g., sufficient proximity to effect the short-range communication). In some implementations, the short-range communication channel permits the electronic device 420 to communicate with the lock 450, and consequently permits use of the electronic key, only when the electronic device 420 is located within some distance of the lock (e.g., within approximately 5 feet, approximately 10 feet, approximately 15 feet, approximately 30 feet, approximately 50 feet, approximately 100, etc.).

The electronic device 420 receives the lock code 474 from the lock 450 through proximity-dependent communication. The electronic device 420 sends the lock code 474 to the computing system 308 with the use data 452. The computing device 430 determines that the lock code 474 is valid, and thus that the electronic device 420 is in proximity to the lock 450. Based on determining that the electronic device 420 is in proximity to the lock 450, the computing device 430 sends the access code 432 to the electronic device 420. The electronic device 420 transmits the access code 432 to the lock 450, and the lock 450 opens.

If the computing system 308 determines that the lock code 474 is not valid, or if the lock code 474 is not provided by the electronic device 420, the computing system 308 may determine that the electronic device 420 is not currently in proximity to the lock 450. Accordingly, the computing system 308 may not provide the access code 432, which denies the recipient 421 the ability to open the lock 450.

In some implementations, other forms of verifying the proximity of the electronic device 420 to the lock 450, and thus the proximity of the recipient 421 associated with the electronic device 420, may be used. For example, the electronic device 420 can capture an image of the lock 450 with a camera, the electronic device 420 can obtain global positioning system (GPS) or other location data, the position of the electronic device 420 can be triangulated with WiFi or cellular network access stations, and so on.

In some implementations, proximity to the lock 450 is not required, and the recipient 421 may open the lock remotely, through interactions with the computing device 430 and the lock 450 over the network 306.

Figure 5B:
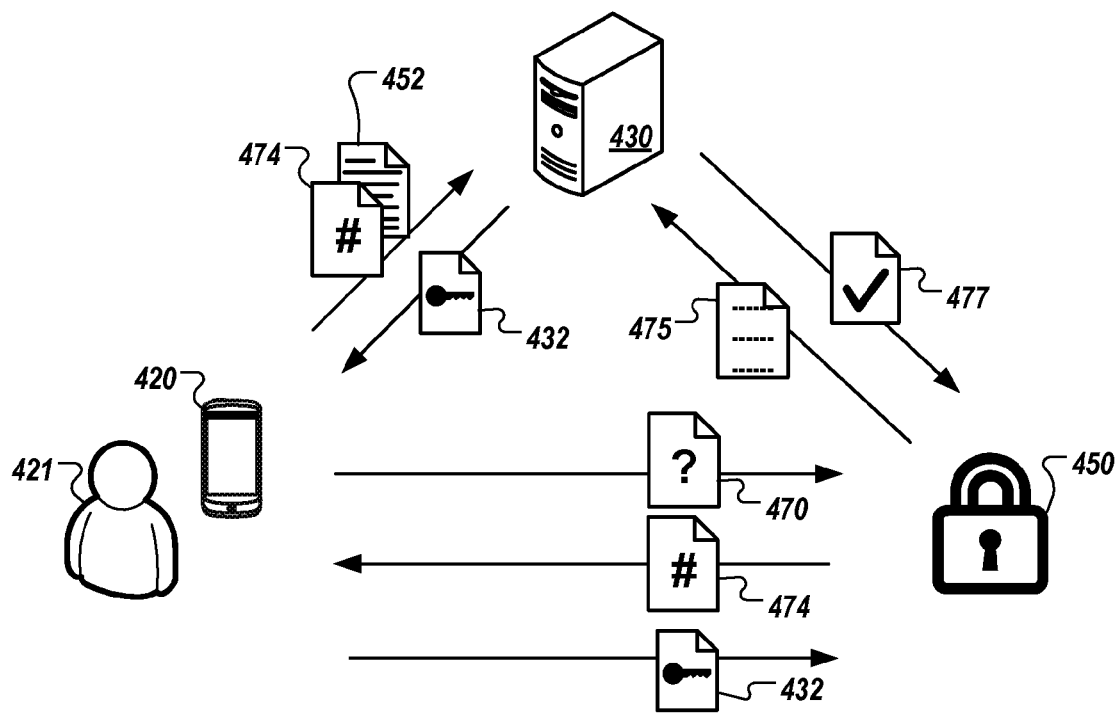

FIG. 5B illustrates another example of interactions that open the lock 450. The example of FIG. 5B includes the interactions described for FIG. 5A. In addition, the lock 450 also communicates with the computing system 308 by sending use data 475 that describes the attempted use of the electronic key. The use data 475 may be sent by the lock 450, and not by or through the electronic device 420, to reduce the risk of tampering by other systems. The use data 475 may include data to which the electronic device 420 generally does not have access, such as usage logs stored by the lock 450. In some implementations, the use data 475 is relayed through the electronic device 420 to the computing system 308. In some implementations, the use data 452 is relayed through the lock 450 to the computing system 308.

The lock 450 may send the use data 475 in response to receiving the message 470 and/or in response to receiving the access code 432 from the electronic device 420. The computing system 308 may evaluate the use data 475 from the lock 450, as well as the use data 452 from the electronic device 420, to determine whether the conditions on use of the electronic key are satisfied. In response to evaluating the use data 452, the computing system 308 may send a message 477 confirming that the lock 450 should open in response to the access code 432. In some implementations, the lock 450 opens only when the message 477 from the computing system 308 is received.

Figure 5C:
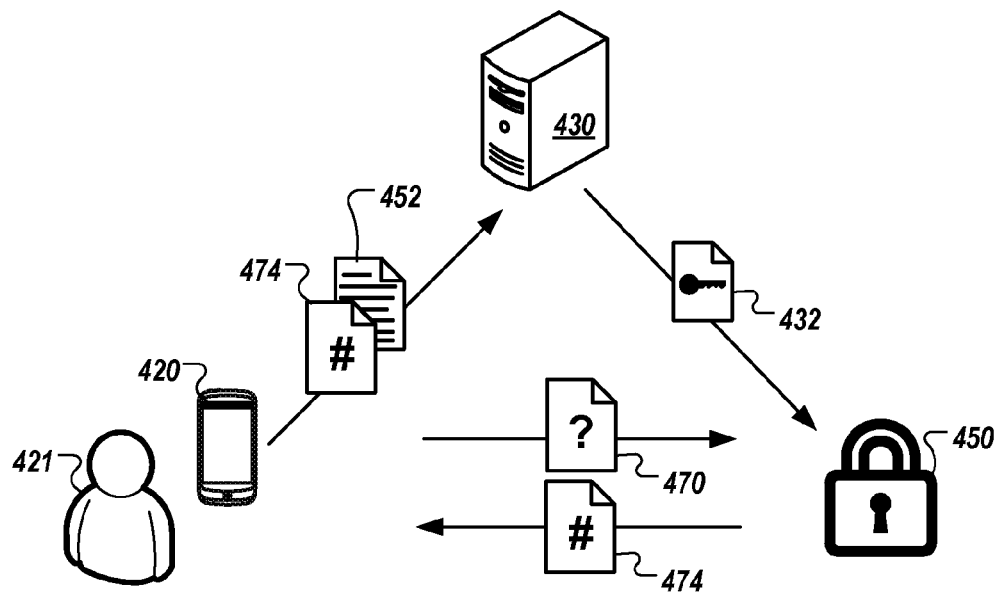

FIG. 5C illustrates another example of interactions that open the lock 450. As described above with respect to FIG. 5A, the electronic device 420 sends the message 470 to the lock 450, and receives the lock code 474 in response. The electronic device 420 sends the use data 452, including the lock code 474, to the computing system 308.

The computing system 308 evaluates the use data 452 and the lock code 474, and determines whether the conditions on use of the electronic key are satisfied. Unlike the example of FIG. 5A, responsive to a determination that the conditions on use of the electronic key are satisfied, the computing system 308 sends the access code 432 to the lock 450 over the network 306 (e.g., without sending the access code 432 to the electronic device 420), thereby causing the lock to open. In the event that the computing system 308 determines that the conditions on use of the electronic key are not satisfied, the computing system 308 may not send the access code 432 to the lock 450.

Figure 5D:
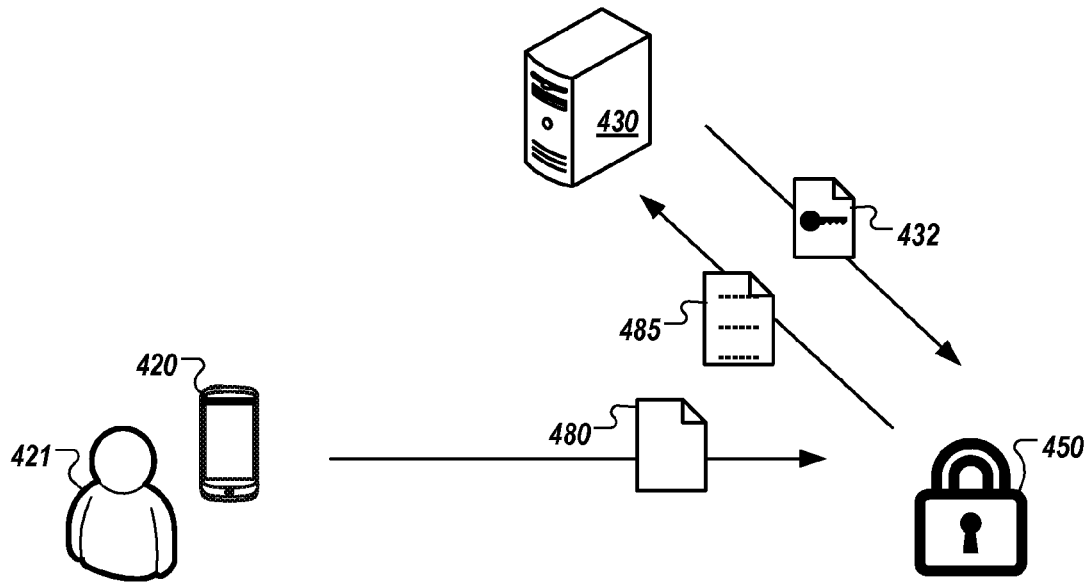

FIG. 5D illustrates another example of interactions that open the lock 450. In the example, the electronic device 420 interacts with the lock 450 (e.g., using any one or more of the techniques described above), and provides data 480 that identifies the electronic key (e.g., an identifier for the recipient 421, an identifier for the electronic key itself, an identifier for the electronic device 420, etc.) The data 480 may include other information, such as, for example, data authenticating the recipient 421, data indicating the presence of others accompanying the recipient 421, or other data that indicates whether conditions on use of the electronic key are satisfied.

Based on the data 480, the lock 450 sends use data 485 to the computing system 308 over the network 306, thereby enabling the computing system 308 to determine whether the conditions on use of the electronic key have been satisfied. After determining that the conditions have been satisfied, the computing system 308 sends the access code 432 to the lock 450 over the network 306, thereby causing the lock to open. In some implementations, no direct interaction between the electronic device 420 and the computing system 308 may be required at the time the electronic key is used. In the event that the computing system 308 determines that the conditions have not been satisfied, the computing system 308 may not send the access code 432 to the lock 450.

Figure 5E:
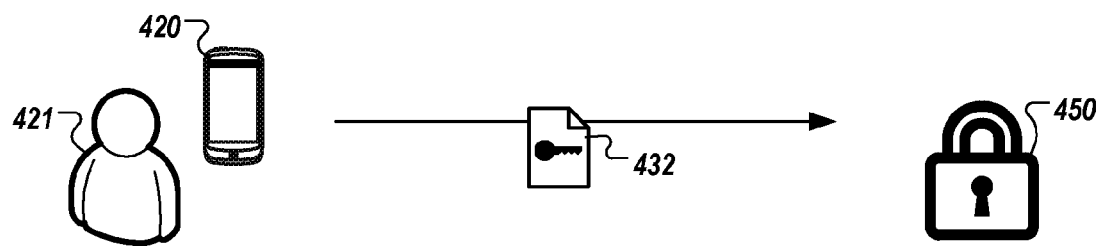

FIG. 5E illustrates another example of interactions that open the lock 450. In the example, the electronic device 420 opens the lock 450 without interacting with the computing system 308. The electronic device 420 stores the access code 432 in local electronic storage before the recipient 421 initiates unlocking of the lock 450. For example, the access code 432 that opens the lock 450 may be downloaded to the electronic device 430 when the electronic key is issued to the recipient 421. The access code 432 may continue to be stored on the electronic device 420 until, for example, the electronic key expires or is revoked.

In response to detecting that the recipient 421 performed an unlocking action, the electronic device 420 determines whether any conditions have been imposed on use of the electronic key. For each of the electronic keys issued to the recipient 421, the electronic device 420 may store key data that identifies (i) the lock corresponding to the electronic key, (ii) the conditions on use of the electronic key, if any, and (iii) access codes that open the lock. The electronic device 420 accesses the locally stored key data for the electronic key that opens the lock 450. The electronic device 420 may receive user input from the recipient 421 indicating that this electronic key should be used. In addition, or as an alternative, the electronic device 420 may receive a lock identifier from the lock 450, and may identify, based on the lock identifier, the electronic key that corresponds to the lock 450 (e.g., by selecting the electronic key from among multiple electronic keys for which key data is stored on the electronic device). The key data for the electronic key indicates whether any conditions are imposed on use of the electronic key, and what those conditions are, if any.

If no conditions have been imposed on use of the electronic key, the electronic device 420 transmits the access code 432 to the lock 450 in response to detecting the unlocking action performed by the recipient 421. If one or more conditions have been imposed on use of the electronic key, the electronic device 420 determines whether the conditions on the electronic key are satisfied, without communicating with the computing system 308. For many conditions, the electronic device 420 may store or have access to data that indicates whether the conditions are satisfied. For example, for a condition requiring use during a particular time period, the electronic device 420 can determine whether the current time (e.g., the time of the unlocking action by the recipient 421) is within the particular time period. Similarly, for a condition requiring a valid driver's license, a credential management application, a credential file, or other data may permit the electronic device 420 to determine, without communication with the computing system 308 or even any other device, whether the recipient 421 possesses the credential.

In the example, the electronic device 420 determines that conditions on use of the electronic key are satisfied, and the electronic device 420 transmits the access code 432 to the lock 450.

In the examples of FIGS. 4 and 5A-5E, other interactions between the lock 450, the electronic device 420, and the computing system 308 may also occur. In addition, interactions with other devices may occur. For example, to indicate the presence of a companion accompanying the recipient, the companion may enter a password directly to the electronic device 420. In addition, or as an alternative, the companion may enter the password directly to a different electronic device, such as the companion's mobile phone, and the companion's mobile phone may transmit the password to the computing system 308. In addition, or as an alternative, the companion's mobile phone may transmit the password to the electronic device 420, which then sends the password to the computing system 308.

In some implementations, multiple electronic keys may be required to be used together to open the lock 450. For example, the recipient 421 and another person may be required to both use their electronic keys (using interactions as shown in any of the examples of 4 and 5A-5E) within a defined period of time of each other (e.g., within 1 minute, 5 minutes, 30 minutes, or 1 hour) in order for the access code 432 to be provided and the lock 450 to be opened. Two or more users may interact with the same lock using the same electronic device, or using different devices. For example, two users may each tap the same lock with a different mobile phone, where the mobile phones are registered to their respective social networking user identities. Based on identifiers for the mobile phones, the identity and presence of both users at the lock can be verified.

Figure 6:
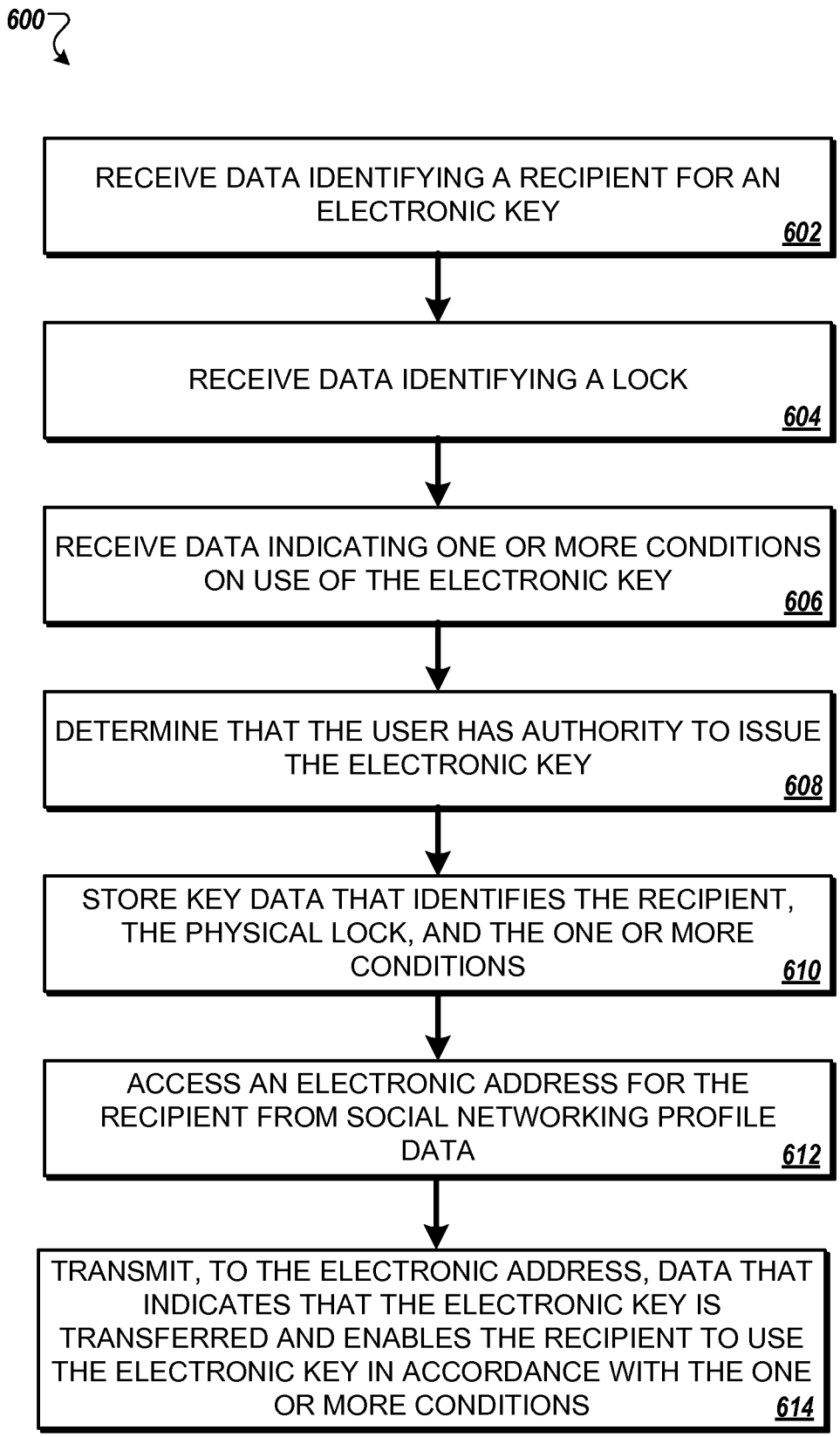
FIG. 6 is a flow diagram illustrating an example of a process for transferring an electronic key using a social networking platform.

FIG. 6 illustrates an example of a process 600 for issuing an electronic key leveraging a social networking platform. For convenience, operations of the process 600 are described as being performed by the computing system 308. However, the operations of the process 600 may be performed by other computer systems described throughout this disclosure or an electronic device that includes a processor.

The computing system 308 receives data identifying a recipient for an electronic key provided by a user (602). The recipient is connected to the user in a social networking platform. In some implementations, the computing system 308 accesses, from the social networking platform, data identifying a set of multiple users that are connected to the user in the social networking platform. The computing system 308 provides information (e.g., a list) identifying the set of users that are connected to the user. Based on input provided by the user, the computing system 308 receives data identifying one or more users, selected from among the set of multiple users connected to the user in the social networking platform, that should be recipients of the electronic key.

The data identifying the recipient may be based on input provided by a user through a social networking service. The social networking service may be an application or interface through which the user receives data from, or provides data to, the social networking platform. The social networking service may be provided by the computing system 308, the social networking platform, or another device, or combinations thereof.

In some implementations, the data identifies multiple users of the social networking platform as recipients for the electronic key. For example, the user may individually select multiple users as recipients for an electronic key. As another example, the user may designate a group of users defined within the social networking platform as a group of recipients for an electronic key. Recipients of the electronic key may be selected from among, and may include, users that are connected to the user in different (e.g., separate or independent) social networking platforms.

The computing system 308 receives data identifying a lock that the electronic key opens (604). The data identifying the lock may be based on input provided by a user through a social networking service, for example, through an application or the social networking platform. In some implementations, the computing system 308 provides data indicating a set of locks for which the user has been determined to have access control. The computing system 308 receives data identifying one or more locks, selected from the set of locks for which the user has access control, that the electronic key should open.

The lock can be a physical lock. For example, the lock can have one or more physical elements that control physical access to a resource. The lock can secure a physical space, such as a building, a room, the interior of a vehicle, or a storage compartment. The lock can secure the function of a physical device, for example, limiting ignition of a vehicle's engine, or mechanically limiting other functionality.

The computing system 308 receives data indicating one or more conditions on use of the electronic key (606). The data indicating the one or more conditions may be based on input provided by a user through a social networking service.

Examples of conditions on use of an electronic key include conditions that: (1) limit a time during which the electronic key may be used; (2) require the recipient to possess a particular credential or qualification; (3) require approval from the key issuer for each use of the electronic key; (4) limit a number of times that the electronic key may be used; (5) require the recipient to be accompanied by another person (e.g., a person selected from a defined list of persons, or a person that has a particular qualification); (6) require the key issuer to be outside of, or be located beyond a predetermined distance from, a space to which the electronic key provides access when the key is used; and (7) require the identity of the recipient to be confirmed at the time the electronic key is used (e.g., through a password, a biometric input, or another form of authentication).

As an example, a grandparent may issue an electronic key a grandchild that permits entry to the grandparent's house. To avoid potential mischief that the grandchild may cause when alone, the grandparent may set a condition that grandchild must be accompanied by someone who has the qualification of being over age 18, and who has the additional qualification of being designated as a family member of the grandparent in the social networking platform.

As another example, when a user goes on vacation, the user may enlist the help of a neighbor to water his plants and feed his cat. To allow the neighbor to perform these tasks, the user may issue to a neighbor an electronic key that opens the user's house. The user may specify the condition that the key may only be used during the vacation, e.g., from August 2 to August 9. In addition, in case the user comes home early and the neighbor's help is no longer needed, the user may specify the condition that the electronic key may not be used when the user is home.

As another example, a user who left something important at home may ask a friend to go pick it up. The user may issue to the friend an electronic key that unlocks the door to his home. Since entry to the home is needed for only a specific incident, the user may specify the condition that the key is only valid for one use. Further, the user may specify that the electronic key expires at the end of the day, whether or not the electronic key has been used.

As another example, a boss may issue an employee a key to an office or conference room. The boss may set the condition that the electronic key may be used at any time between 7:00 am and 6:00 pm on weekdays, but that any use of the electronic key at other times requires specific approval from the boss.

The computing system 308 determines that the user has authority to issue an electronic key to the lock (608). For example, the computing system 308 may determine that the lock is included in a list of locks registered to the user as being controlled by the user. As another example, the computing system 308 may determine that the lock and/or a resource secured by the lock are owned by the user. As another example, the computing system may determine that the owner of the lock and/or a resource secured by the lock has delegated access control authority to the user.

The computing system 308 stores key data that identifies the recipient of the electronic key, the lock, and the one or more conditions on use of the electronic key (610). In some implementations, the computing system 308 stores the key data in response to determining that the user has authority to issue the electronic key. The key data may be stored in electronic storage, for example, a table, a database, or another data structure. In some implementations, the key data includes additional information about the lock, for example, one or more access codes that open the lock.

The computing system 308 accesses an electronic address for the recipient (612). For example, the computing system 308 accesses the electronic address from profile data for the recipient from the social networking platform. The electronic address may be, for example, an e-mail address, a phone number, a username for the recipient in the social networking platform, or another address. Additionally or alternatively, in some implementations, the electronic address may be an account that the user has registered with a key management application executing on the computing system 308.

The computing system 308 transmits data that indicates that the electronic key is transferred (614). The data may be transmitted to the electronic address for the recipient. For example, the data may be transmitted by e-mail, short message service (SMS) text message, social networking post, or by another communication channel, for example, as an in-application communication within a key management application.

The computing system 308 transmits that data may enable the recipient to use the electronic key in accordance with the one or more conditions imposed by the user. The data may include configuration data that enables an electronic device associated with the recipient to communicate with the lock and initiate an unlocking sequence. In some implementations, the computing system 308 transmits an access code that may be used to open the lock (e.g., successfully complete the unlocking sequence). The access code may be stored on an electronic device (e.g., such as a mobile phone) and used to open the lock, either with or without further communication with the computing system 308. The data that enables use of the electronic key can indicate the one or more conditions on use of the electronic key.

In some implementations, the computing system 308 identifies a recipient based on the recipient's log-in information when the recipient logs in to an application or to the social networking platform using an electronic device. The computing system 308 determines that an electronic key has been issued to the recipient, and in response, transfers to the electronic device the data enabling the recipient to use the electronic key. Thereafter, the electronic device may be used to open the lock.

In some implementations, the electronic key may be revoked at any time by the user that owns control of the lock (e.g., by the user that issues the electronic key). After the electronic key is issued, the computing system 308 may receive revocation data that indicates that the recipient should no longer have access to the electronic key. As a result, the computing system 308 can store key data that indicates that the electronic key is revoked. Or, the computing system 308 can delete the stored key data that indicated that the electronic key provided access to the lock. The computing system 308 may also transmit, to the electronic address of the recipient, data indicating that access to the electronic key is terminated. Thereafter, when the computing system 308 receives use data indicating an attempted use of the electronic key, the computing system 308 may transmit notification data indicating that access to the lock is denied. The notification data may be transmitted to the electronic address for the recipient.

Figure 7:
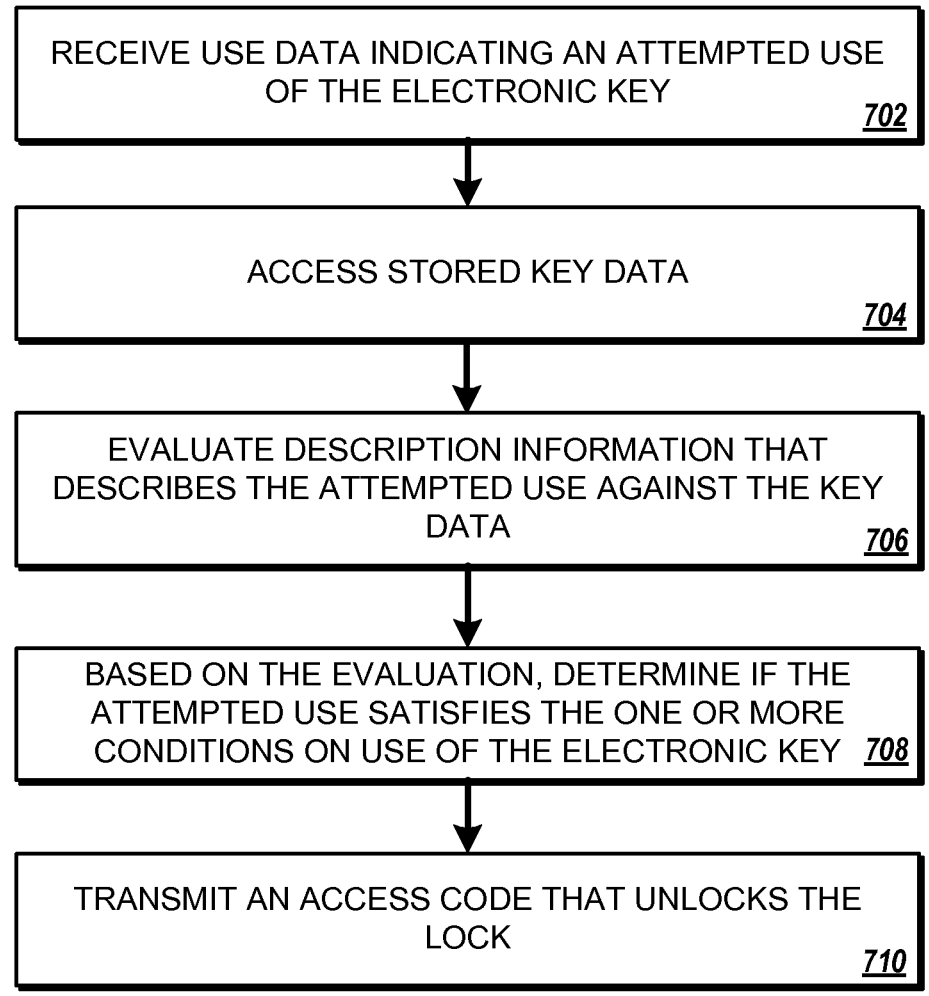
FIG. 7 is a flow diagram illustrating an example of a process for using an electronic key.

FIG. 7 illustrates an example of a process 700 for enabling use of an electronic key. For convenience, operations of the process 700 are described as being performed by the computing system 308. However, the operations of the process 700 may be performed by other computer systems described throughout this disclosure or an electronic device that includes a processor.

The computing system 308 receives use data indicating an attempted use of the electronic key (702). The use data identifies the electronic key and includes description information that describes the attempted use. To identify the electronic key, an identifier for the electronic key may be provided. In addition, or as an alternative, the use data can identify the recipient of the electronic key and the lock. In some implementations, the use data is received from an electronic device, for example, from a mobile phone or other device associated with the recipient. In some implementations, the use data is received from another electronic device, such as the lock or a device connected to or otherwise associated the lock.

The description information can indicate, for example, the context or circumstances of the attempted use. For example, the description information can indicate social networking user identities of users accompanying the recipient. The description information can include data authenticating the recipient and/or the electronic device, for example, biometric data for the recipient, a password of the recipient, and/or a device identifier for the electronic device.

The computing system 308 accesses the stored key data (704). For example, the computing system 308 determines the conditions associated with use of the electronic key. The computing system 308 evaluates the description information that describes the attempted use of the electronic key against the stored key data (706). Based on the evaluation, the computing system 308 determines if the attempted use satisfies the one or more conditions on use of the electronic key (708). In response to a determination that the attempted use satisfies the one or more conditions, the computing system 308 transmits to the electronic device an access code that unlocks the lock (710). If, however, the computing device determines that the attempted use does not satisfy the one or more conditions on use of the electronic key, the computing system transmits data indicating that access to the lock is denied.

In some implementations, the electronic device is a mobile phone associated with the recipient. The access code that unlocks the lock can be transmitted to the mobile phone associated with the recipient over a network, and the mobile phone may transmit the access code to the lock directly (e.g., according to techniques described above).

In some implementations, the electronic device is the lock or a device in communication with the lock. When the recipient presents a key code to the lock, the lock can provide the use data to query the computing system 308 about whether the conditions on use of the key code are satisfied.

The evaluation performed by the computing system 308 can include various operations, depending on the conditions imposed on the electronic key. In some implementations, the use data includes authentication data, and the authentication data is compared with stored reference data (e.g., previously stored information identifying information). The identity of the recipient may be confirmed based on the comparison, satisfying an authentication condition.

In some implementations, the computing system 308 determines a time of the attempted use of the electronic key, and compares the time to a time period indicated in the key data. When the attempted use is determined to be within the time period, the computing system 308 determines that a time condition is satisfied.

In some implementations, the lock controls access to a physical space, and the computing system 308 determines whether the user that issued the electronic key is in a location other than the physical space. For example, the computing system 308 may obtain access logs for the lock and determine whether the user has opened the lock within a defined period of time, such as 6 hours, 1 day, or 1 week. Additionally or alternatively, the computing system 308 may maintain its own access logs for the lock and determine whether the user has opened the lock within a defined period of time. If the user has not opened the lock within the defined period of time, the user may be considered to be outside the physical space. As another example, the computing system 308 may obtain location information indicating the user's location from a check-in, status update, post, or other social network data from the social networking platform, or from GPS data for the user. When the location information indicates that the user is away from the physical space, the computing system 308 may determine that a condition requiring the absence of the user is satisfied.

In some implementations, the computing system 308 determines that the recipient has a particular qualification (e.g., a qualification other than having been issued the electronic key and being connected to the user in the social networking platform). The qualification may be a credential issued by a third-party, such as a driver's license issued by a government agency, a degree issued by an educational institution, or a job title given by an employer. The qualification may be a characteristic of a person, such as age or height, or a skill or an ability of a person, such as an ability to speak a language. The computing system 308 may access data indicating the recipient's qualifications from the social networking platform or other sources. In some implementations, the computing system 308 may access data indicating the recipient's qualifications from one or more electronic credentials maintained on the same electronic device on which the electronic key is maintained. When the recipient possesses the required qualification, the computing system 308 may determine that a qualification condition is satisfied.

In some implementations, the computing system 308 sends a request for approval of an attempted use to the user that issued the electronic key. When the computing system 308 receives approval data indicating approval of the attempted use of the electronic key, the computing system 308 may determine that an approval condition is satisfied.

In some implementations, the computing system 308 determines a number of previous uses of the electronic key. The computing system 308 may compare the number of previous uses with a predetermined maximum number of times that the recipient is permitted to use the electronic key, as indicated by the stored key data. When the number of uses is less than the predetermined maximum number, the computing system 308 may determine that a limited use condition is satisfied.

In some implementations, the computing system 308 receives, in the use data or in connection with the use data, presence data that indicates the identity of a person who accompanies the recipient when use of the electronic key is attempted. The presence data may include a password of the person, biometric input from the person, a device identifier for a device associated with the person, and/or other authentication data for the person. The presence data may be entered directly into an electronic device associated with the recipient (e.g., the recipient's mobile phone), an electronic device associated with the person (e.g., the person's mobile phone, which is different from the recipient's mobile phone), the lock, or another device. Any of the devices to which the presence data is entered may transmit the presence data to the computing system 308. In addition, or as an alternative, the presence data may be passed between two or more of these devices and then to the computing system 308. For example, the person's mobile phone may transmit the presence data to the recipient's mobile phone, and the recipient's mobile phone may transmit the presence data to the computing device. As another example, the person's mobile phone may transmit the presence data to lock, and the lock may transmit the presence data to the computing device. The computing system 308 determines whether the person satisfies one or more criteria for a companion required to accompany the recipient when using the electronic key. For example, the computing system 308 determines whether the person possesses one or more qualifications indicated in the key data, or whether the person is one of a predetermined set of persons designated in the key data. When the person meets the one or more criteria, the computing system may determine that a companion condition is satisfied.

As described above, when the conditions on use of an electronic key are not met, the computing system 308 withholds the access code that opens the lock and transmits data indicating that access to the lock is denied. This may occur when the computing system 308 determines that, for example, the attempted use is outside a time period designated in the key data, authentication data does not match reference data for the recipient, the recipient does not have a required qualification, a maximum number of uses of the electronic key is exceeded, the user that issued the key denies or fails to grant a required approval of use, or the recipient is not accompanied by a required person.

FIG. 8 illustrates an example of key data that may be stored by the computing system 308 in electronic storage. The key data is illustrated in a table 800, in which each row 801a-801e represents data for a different key. The columns 806a-806g indicate various types of information about the electronic keys. The key data may additionally or alternatively be stored in formats and data structures other than those illustrated.

The table 800 includes an ID column 802a that includes an identifier for each electronic key, distinguishing the key from the other electronic keys. The table 800 includes a recipient column 802*b* that identifies the recipient of the electronic key. The electronic keys can be linked to the social networking user identities for the recipients. For example, the social networking username or profile identifier may be stored in the recipient column 802*b*. The table 800 includes a lock column 802*c* that identifies the lock or locks to which the various electronic keys provide access (e.g., to open, close, or otherwise manipulate). The lock column 802*c* may identify locks with any appropriate identifiers, such as, for example, identification (ID) numbers or other unique identifiers assigned to the locks, addresses for buildings, room and floor numbers for rooms within a building, or license plates numbers or VIN numbers for vehicles.

The table 800 also includes columns 802*d*-802*g* that specify conditions on use of the electronic keys. A time conditions column 802*d* indicates conditions that limit the time during which an electronic key can be used. A credential conditions column 802*e* indicates credentials that the recipient must possess in order to use the electronic key. An authentication conditions column 802*f* indicates measures required to authenticate the user in order to use the electronic key. An "other conditions" column 802*g* indicates additional conditions that limit use of the electronic keys. A variety of additional or alternative conditions may be imposed on electronic keys, as described above.

Figure 9:
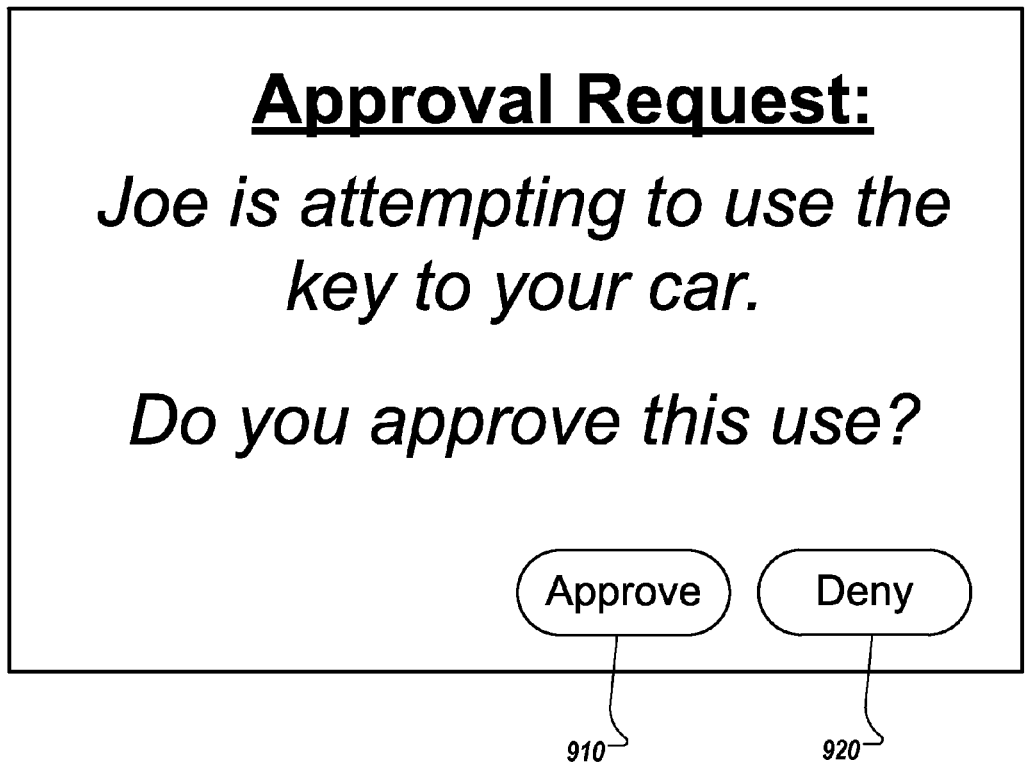
FIG. 9 is a diagram illustrating an example of a user interface for approving use of an electronic key.

FIG. 9 is an example of a user interface 900 that may be presented to a key issuer to request approval of use of an electronic key by a key recipient. For example, a key issuer may place a condition on an electronic key that each use of the electronic key must be approved by the key issuer. When use of the electronic key is attempted, the computing system 308 may indicate the attempted use to an electronic device associated with the key issuer, such as the electronic device 410 of FIG. 4. In response, the application on the electronic device 410 that manages the electronic keys may present the user interface 900.

The user interface 900 includes an approve control 910 that the key issuer may interact with to approve the attempted use of the electronic key. When the approve control 910 is selected, the electronic device 410 sends data indicating the approval to the computing system 308, and, in response, the computing system 308 transmits an approval code to the recipient, enabling the recipient to open the lock. The user interface 900 includes a deny control 920 that the key issuer may select to deny access to the recipient. When the deny control 920 is selected, the electronic device 410 sends data indicating the denial to the computing system 308. The computing system 308 sends data to the recipient indicating that access is denied.

Figure 10:
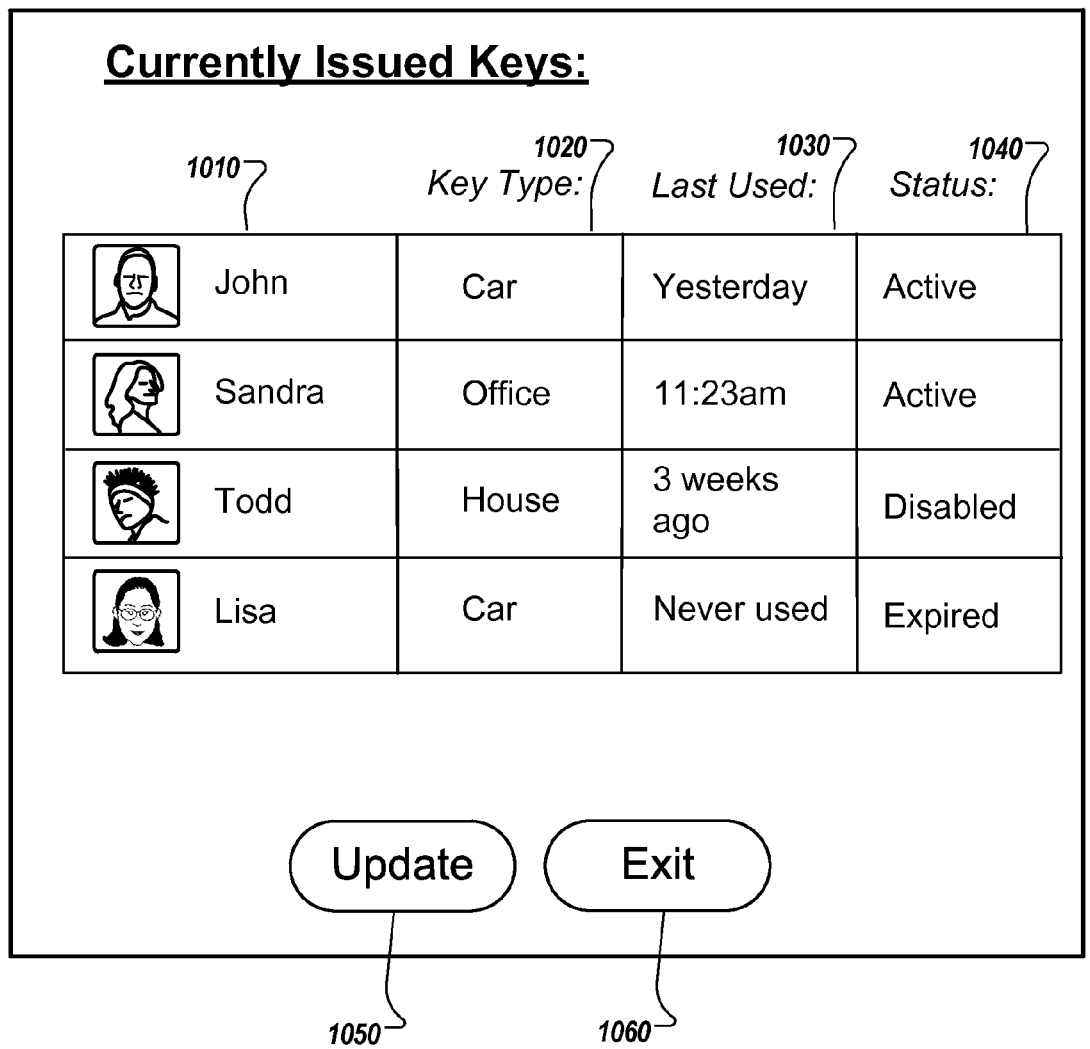
FIG. 10 is a diagram illustrating an example of a user interface for providing information about electronic keys.

FIG. 10 illustrates an example report 1000 provided by the computing system 308. The report 1000 presents information about electronic keys issued by a particular user. As shown, the report 1000 includes an identity column 1010 that shows a social networking user identity to which the corresponding electronic key has been issued by the user. The report 1000 also includes a key type column 1020 that identifies the lock or locked resource to which the corresponding electronic key provides access. The report 1000 further includes a last used column 1030 that indicates when the last use of the corresponding electronic key was used. The report 1000 may additionally or alternatively provide other information, such as, for example, information about unsuccessful attempted uses of the electronic keys, logs of attempted uses, and indications of the conditions currently imposed on the electronic keys.

As indicated by the report 1000, the user issued an electronic key to John that unlocks the user's car, the electronic key was last used yesterday, and the electronic key is still active. Also as indicated by the report 1000, the user issued an electronic key to Sandra that unlocks the user's office, the electronic key was last used at 11:23 am on the day the report was provided, and the electronic key is still active. In addition, the user issued an electronic key to Todd that unlocks the user's house, the electronic key was last used three weeks ago, and the electronic key is currently disabled. Finally, the user issued a key to Lisa that unlocks the user's car, the electronic key was never used, and the electronic key has expired.

The report 1000 includes an update control 1050 and an exit control 1060. The update control 1050 causes display of an interface that enables the user to update one or more of the electronic keys, for example, by adding, removing, or modifying conditions on use of one or more of the electronic keys. For instance, viewing the report 1000 may cause the user to desire to increase or reduce the conditions imposed on the electronic keys. Invocation of update control 1050 may enable the user to do so. The exit control 1060 removes the report 1000 from display.

Figure 11:
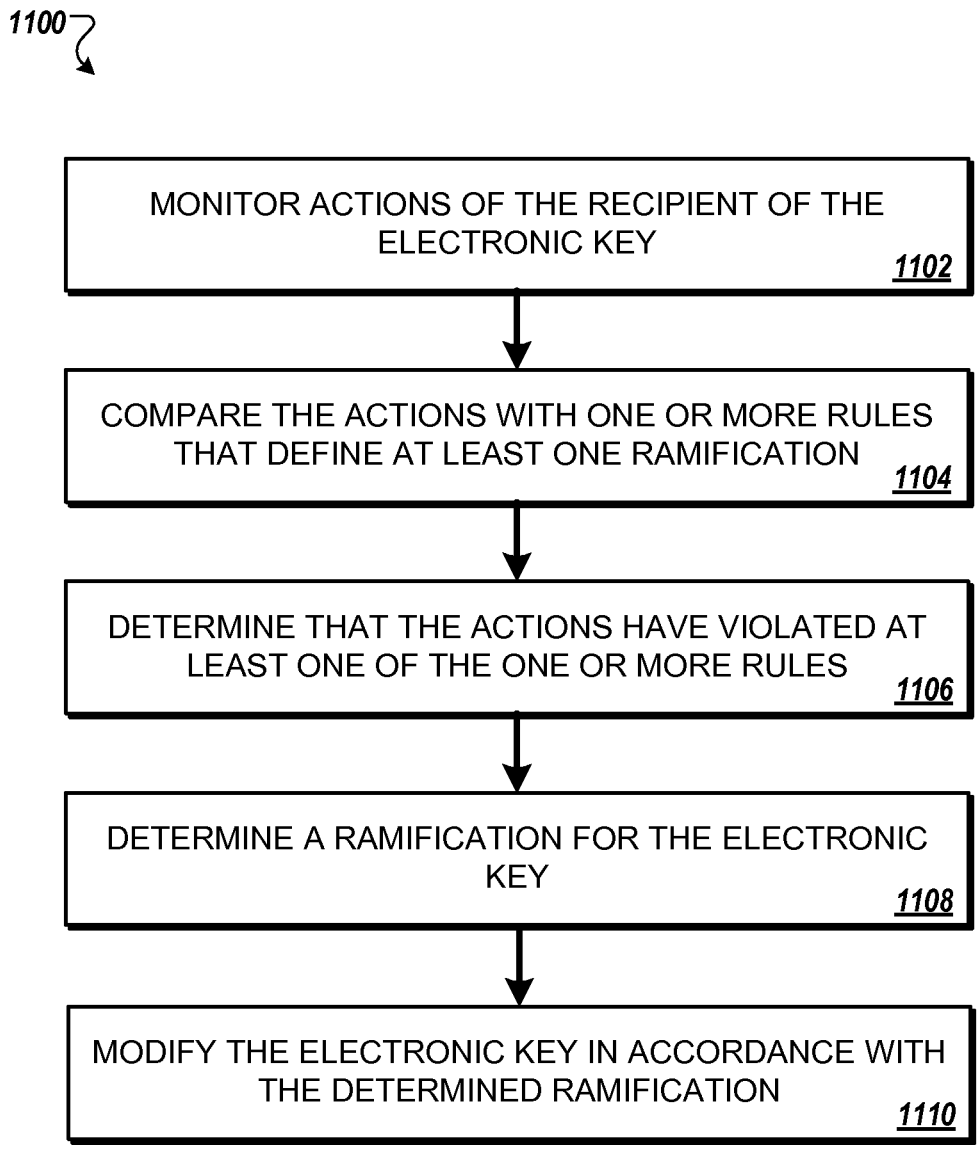
FIG. 11 is a flow diagram illustrating an example process for modifying an electronic key based on actions of a recipient of the electronic key.

FIG. 11 illustrates an example process 1100 for modifying an electronic key based on actions of a recipient of the electronic key. For convenience, operations of the process 1100 are described as being performed by the computing system 308. However, the operations of the process 1100 may be performed by other computer systems described throughout this disclosure or an electronic device that includes a processor.

The computing system 308 monitors actions of the recipient of the electronic key (1102). For example, the computing system 308 monitors any types of actions of the recipient that are possible to monitor using the computing system 308. In this example, the computing system 308 may monitor attempts to use the electronic key and may monitor social networking actions of the recipient within the social networking platform. In monitoring attempted uses of the electronic key, the computing system 308 may monitor the frequency of use, time of use, number of uses, and the particular circumstances of each use. In monitoring social networking actions of the recipient within the social networking platform, the computing system 308 may monitor connections made or broken by the recipient, posts within the social networking platform, or any other type action within the social networking platform.

The computing system 308 compares the actions of the recipient of the electronic key with one or more rules that define at least one ramification for the electronic key that results from one or more specific actions of the recipient (1104). For instance, when the computing system 308 monitors attempted uses of the electronic key by the recipient, the computing system 308 compares parameters of the use with the conditions on use of the electronic key to determine whether the recipient violated the conditions. When the computing system 308 monitors social networking actions of the recipient within the social networking platform, the computing system 308 compares the social networking actions with rules that define when electronic keys should be modified based on social networking actions. The social networking actions may include actions related to connections within the social networking platform, messages exchanged within the social networking platform (e.g., posts), and/or any other types of actions that provide meaningful information relevant to an electronic key.

The computing system 308 determines that the actions of the recipient of the electronic key have violated at least one of the one or more rules (1106). For example, when the computing system 308 monitors attempted uses of the electronic key, the computing system 308 determines that the recipient violated the conditions of the transaction specified by the rule. In addition, when the computing system 308 monitors social networking actions of the recipient within the social networking platform, the computing system 308 determines that the recipient violated rules defining appropriate conduct for users who have received the electronic key. The rules may be generally applicable to all electronic keys, or may be designated by the key issuer to apply to a particular electronic key.

Based on the determination that the actions of the recipient of the electronic key have violated at least one of the one or more rules, the computing system 308 determines a ramification for the electronic key defined by the at least one of the one or more rules (1108). For instance, the computing system 308 determines a ramification that revokes the electronic key or modifies the electronic key. The electronic key can be modified by adding or modifying a condition on use of the electronic key. The ramification may be selected from a record in a database pertaining to the rule violated.

The computing system 308 modifies the electronic key in accordance with the determined ramification (1110). For example, the computing system 308 revokes the electronic key, temporarily disables the electronic key (e.g., disables the electronic key for a predetermined period of time), reduces level of access attainable using the electronic key, adds or modifies one or more conditions limiting use of the electronic key, and/or places other restrictions on the electronic key. The electronic key may still be available for use, but with the ramification applied.

As an example, the computing system 308 may monitor actions of the recipient and determine that a number of unsuccessful attempts to use the electronic key have occurred during a time period. The computing system 308 may compare the number of unsuccessful attempts to a threshold number of unsuccessful attempts indicated in a rule, and determine that the number exceeds the threshold number. Based on the comparison, the computing system 308 may determine that the actions have violated the rule, and the computing system 308 may determine that the ramification associated with violating the rule is for the electronic key to be disabled for seven days. The computing system 308 may also determine that the ramification includes applying a new condition on use of the electronic key, requiring that the key issuer subsequently approve each use of the electronic key. The computing system 308 may then modify stored key data to cause the electronic key to be disabled for seven days and for the new condition to be applied.

Figure 12:
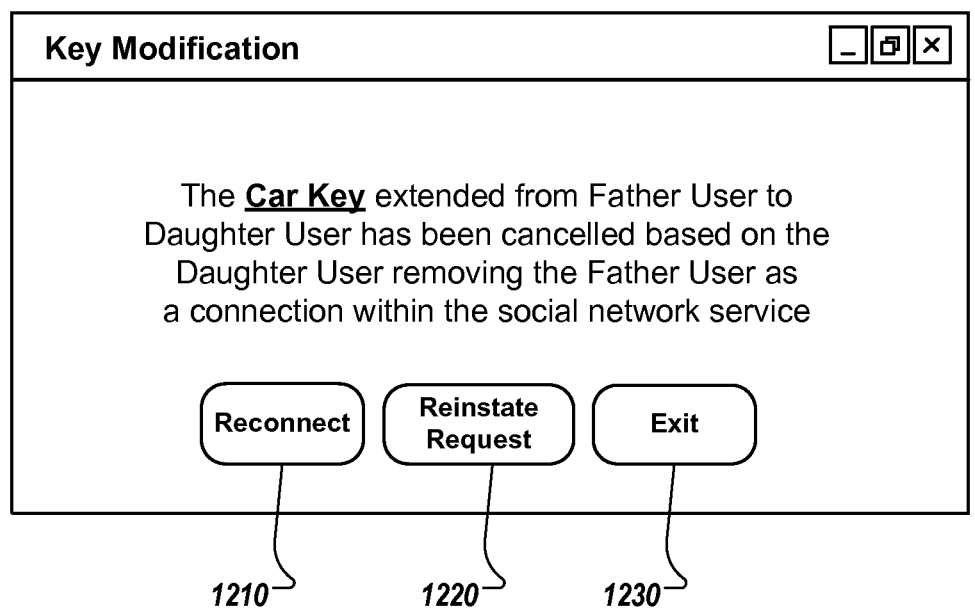
FIG. 12 is a diagram illustrating an example of a user interface for providing an alert about an electronic key

FIG. 12 illustrates an example alert 1200 that alerts the issuer of an electronic key and/or the recipient of the electronic key that the electronic key has been revoked (e.g., cancelled or disabled) based on actions taken by the recipient of the electronic key. As shown, the alert 1200 indicates that the electronic key extended from a Father User to a Daughter User has been revoked because the Daughter User removed the Father User as a connection within the social networking platform. In this regard, the computing system 308 detected that the Daughter User removed the Father User as a connection within the social networking platform. Based on the detection that the Daughter User removed the Father User as a connection within the social networking platform, the computing system 308 determines whether the Father User had previously extended an electronic key to the Daughter User through the social network service. In this example, the computing system 308 determines that the Father User had previously extended an electronic key to the Daughter User through the social network service and determines to revoke the electronic key based on the Daughter User removing the Father User as a connection within the social networking platform. The computing system 308 sends the alert 1200 to the Father User and/or the Daughter User in response to the determination to revoke the electronic key.

The alert 1200 also includes a reconnect control 1210, a reinstate request control 1220, and an exit control 1230. The reconnect control 1210 causes a connection request message to be sent from the Daughter User to the Father User. If the Father User accepts the connection request, the Father User and the Daughter User become reconnected within the social networking platform and the electronic key from the Father User to the Daughter User is restored by the computing system 308.

The reinstate request control 1220 causes a message to be sent to the Father User asking the Father User to reinstate the electronic key, despite the connection between the Father User and the Daughter User being severed in the social networking platform. The Father User may agree to reinstate the electronic key, which causes the computing system 308 to reactivate the electronic key shared by the Father User with the Daughter User. The Father User may decline to reinstate the electronic key, which causes the computing system 308 to maintain the electronic key previously shared by the Father User with the Daughter User in a revoked or disabled state. The exit control 1230 removes the alert 1200 from display and allows the electronic key previously shared by the Father User with the Daughter User to remain in a revoked or disabled state.

While the electronic keys have been described as providing access to physical locks, the techniques described may be used to provide access to any appropriate security or authentication measure. For example, the techniques can be used to issue electronic keys to access computer systems, computer network resources, software systems, particular files, or any other secured resource.

Further, while emphasis has been placed on using electronic keys to open corresponding locks, the electronic keys may equally be configured to lock the corresponding locks. Locking a lock, or otherwise changing the status of a lock using an electronic key, may be limited in accordance with the conditions set by the issuer of the electronic key.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system comprising:
  at least one processor; and
  at least one non-transitory computer-readable medium coupled to the at least one processor having stored thereon instructions which, when executed by the at least one processor, cause the at least one processor to perform operations comprising:
    receiving, based on input provided by a user, data identifying a recipient for an electronic key to a physical lock, the recipient being connected to the user in a social networking platform;
    receiving, based on input provided by the user, data identifying the physical lock to which the user desires to provide the electronic key;
    receiving, based on input provided by the user, data indicating one or more conditions on use of the electronic key;
    determining that the user has authority to issue the electronic key to the physical lock;
    in response to determining that the user has authority to issue the electronic key to the physical lock, storing, in electronic storage, key data that identifies the recipient of the electronic key, the physical lock for which the electronic key is granted, and the one or more conditions on use of the electronic key;
    accessing, from profile data for the recipient from the social networking platform, an electronic address for the recipient;
    transmitting, to the electronic address for the recipient, data that indicates that the electronic key is transferred to the recipient; and
    transmitting, to the electronic address for the recipient, data that enables the recipient to use the electronic key in accordance with the one or more conditions on use of the electronic key.

2. The system of claim 1:
  wherein the operations further comprise:
    accessing, from the social networking platform, data identifying a set of users that are connected to the user in the social networking platform; and
    providing, to an electronic device associated with the user, information identifying the set of users that are connected to the user in the social networking platform;
  wherein receiving, based on input provided by the user, data identifying the recipient for the electronic key comprises receiving, based on input provided by the user, data indicating selection of one or more users from among the set of users that are connected to the user in the social networking platform.

3. The system of claim 1, wherein receiving data identifying the physical lock to which the user desires to provide the electronic key comprises receiving data indicating a physical lock that controls access to a physical space.

4. The system of claim 1, wherein the operations further comprise:
  receiving, based on input provided by the user, revocation data indicating that the recipient should no longer have access to the electronic key;
  based on the revocation data:
    storing, in the electronic storage, key data that indicates that the electronic key is revoked; and
    transmitting, to the electronic address for the recipient, data indicating that access to the electronic key by the recipient is terminated;
  after receiving the revocation data, receiving use data indicating an attempted use of the electronic key; and
  based on the revocation data, transmitting, to an electronic device associated with the recipient, data indicating that the access to the physical lock is denied.

5. The system of claim 1, wherein receiving data identifying the recipient for the electronic key to the physical lock comprises receiving data indicating a recipient that is connected to the user in a first social networking platform;
  wherein the operations further comprise:
    accessing, from the first social networking platform, first social network data identifying users connected to the user in the first social networking platform;
    based on the first social network data, determining that the recipient is connected to the user in the first social networking platform;
  wherein transmitting, to the electronic address for the recipient, the data that indicates that the electronic key is transferred to the recipient comprises transmitting, in response to determining that the first recipient is connected to the user in the first social networking platform, data that indicates that the first electronic key is transferred to the first recipient;

wherein transmitting, to the electronic address for the recipient, the data that enables the recipient to use the electronic key in accordance with the one or more conditions on use of the electronic key comprises transmitting, in response to determining that the first recipient is connected to the user in the first social networking platform, data that enables the first recipient to use the first electronic key in accordance with one or more first conditions on use of the first electronic key;

wherein the operations further comprise:
receiving, based on input provided by a user, data indicating a second recipient for a second electronic key to a second physical lock, the second recipient being connected to the user in a second social networking platform that is operated independently from the first social networking platform;
accessing, from the second social networking platform, second social network data;
based on the second social network data, determining that the second recipient is connected to the user in the second social networking platform;
receiving, based on input provided by a user, data indicating one or more second conditions on use of the second electronic key;
receiving, based on input provided by the user, data identifying the second physical lock to which the user desires to provide the second electronic key;
storing, in electronic storage, key data identifying the second recipient of the second electronic key, the second physical lock for which the second electronic key is granted, and the one or more second conditions on use of the second electronic key;
accessing, from second profile data for the second recipient from the second social networking platform, an electronic address for the second recipient; and
transmitting, to the electronic address for the second recipient and in response to determining that the second recipient is connected to the user in the second social networking platform, data that indicates that the second electronic key is transferred to the second recipient; and
transmitting, to the electronic address for the second recipient and in response to determining that the second recipient is connected to the user in the second social networking platform, data that enables the second recipient to use the second electronic key in accordance with the one or more second conditions on use of the second electronic key.

6. The system of claim 1, wherein the operations further comprise:
receiving, from an electronic device, use data indicating an attempted use of the electronic key, the use data identifying the electronic key and including description information that describes the attempted use;
accessing the stored key data;
evaluating the description information that describes the attempted use of the electronic key against the key data indicating the one or more conditions on use of the electronic key;
based on the evaluation, determining that the attempted use of the electronic key satisfies the one or more conditions on use of the electronic key; and in response to determining that the use of the electronic key satisfies the one or more conditions on use of the electronic key, transmitting, to the electronic device, an access code that unlocks the physical lock.

7. The system of claim 6, wherein receiving, from the electronic device, the use data comprises, receiving the use data from a mobile phone associated with the recipient;
wherein, transmitting, to the electronic device, the access code that unlocks the physical lock comprises transmitting the access code to the mobile phone associated with the recipient.

8. The system of claim 6, wherein receiving, from an electronic device, use data indicating an attempted use of the electronic key comprises receiving, based on input from the recipient, authentication data identifying the recipient;
wherein the operations further comprise:
evaluating the authentication data against stored reference data associated with the recipient; and
based on the evaluation of the authentication data, confirming the identity of the recipient;
wherein transmitting, to the electronic device, the access code that unlocks the physical lock comprises transmitting the access code that unlocks the physical lock in response to confirming the identity of the recipient.

9. The system of claim 6, wherein receiving data indicating the one or more conditions on use of the electronic key comprises receiving data indicating a period of time during which the electronic key is operable;
wherein storing the key data comprises storing key data indicating the period of time;
wherein accessing the stored key data comprises accessing the key data indicating the period of time;
wherein evaluating the description information that describes the use of the electronic key against the key data indicating the one or more conditions on use of the electronic key comprises:
determining a time of the use;
comparing the time with the time period;
wherein determining that the use of the electronic key satisfies the one or more conditions on use of the electronic key comprises determining that the determined time is within the time period;
wherein transmitting the access code that unlocks the physical lock comprises transmitting the access code that unlocks the physical lock in response to determining that the determined time is within the time period; and
wherein the operations further comprise:
receiving, from the electronic device, second use data indicating an attempted second use of the electronic key;
determining a time of the attempted second use;
determining that the time of the attempted second use is outside the time period; and
based on determining that the time of the attempted second use is outside the time period, transmitting, to the electronic device, data indicating that access to the physical lock is denied.

10. The system of claim 6, wherein receiving data indicating the one or more conditions on use of the electronic key comprises receiving data indicating that the electronic key is operable only when the user is in a location other than a physical space to which access is controlled by the physical lock;
wherein determining that the use of the electronic key satisfies the one or more conditions on use of the electronic key comprises determining that the user is in a location other than the physical space; and wherein transmitting the access code that unlocks the physical lock comprises transmitting the access code that unlocks the physical lock in response to determining that the user is not present in the physical space;

wherein the operations further comprise:
receiving, from the electronic device, second use data indicating an attempted second use of the electronic key;
determining that the user is present in the physical space; and
based on determining that the user is present in the physical space, transmitting, to the electronic device, data indicating that access to the physical lock is denied.

11. The system of claim 6, wherein receiving data indicating the one or more conditions on use of the electronic key comprises receiving data indicating that the electronic key is operable only when the recipient has a qualification other than having been issued the electronic key;
wherein determining that the use of the electronic key satisfies the one or more conditions on use of the electronic key comprises determining that the recipient has the qualification; and
wherein transmitting the access code that unlocks the physical lock comprises transmitting the access code that unlocks the physical lock in response to determining that the user has the particular qualification.

12. The system of claim 6, wherein receiving data indicating the one or more conditions on use of the electronic key comprises receiving data indicating that use of the electronic key by the recipient requires approval by the user;
wherein determining that the use of the electronic key satisfies the one or more conditions on use of the electronic key comprises:
in response to receiving the use data, transmitting, to an electronic address for the user, a request for approval of the attempted use of the electronic key; and
receiving, based on input from the user, approval data indicating approval of the attempted use of the electronic key by the recipient; and
wherein transmitting the access code that unlocks the physical lock comprises transmitting the access code that unlocks the physical lock in response to receiving the approval data.

13. The system of claim 6, wherein receiving data indicating the one or more conditions on use of the electronic key comprises receiving data indicating a predetermined number of times that the electronic key can be used by the recipient;
wherein determining that the use of the electronic key satisfies the one or more conditions on use of the electronic key comprises:
determining a number of times that the electronic key has previously been used by the recipient; and
determining that the number of times that the electronic key has previously been used by the recipient is less than the predetermined number of times that the electronic key can be used by the recipient; and
wherein transmitting the access code that unlocks the physical lock comprises transmitting the access code that unlocks the physical lock in response to determining that the number of times that the electronic key has previously been used by the recipient is less than the predetermined number of times that the electronic key can be used by the recipient.

14. The system of claim 6, wherein receiving data indicating the one or more conditions on use of the electronic key comprises receiving data indicating that the electronic key may be used only when the recipient is accompanied by one of a predetermined set of one or more persons;
wherein determining that the use of the electronic key satisfies the one or more conditions on use of the electronic key comprises:
receiving presence data that indicates the identity of a person accompanying the recipient when the use of the electronic key is attempted; and
based on the presence data, determining that the person is one of the predetermined set of one or more persons and that the person accompanies the recipient; and
wherein transmitting the access code that unlocks the physical lock comprises transmitting the access code that unlocks the physical lock in response to determining that the person is one of the predetermined set of one or more persons and that the person accompanies the recipient.

15. The system of claim 6, wherein receiving data indicating the one or more conditions on use of the electronic key comprises receiving data indicating that the electronic key may be used only when the recipient is accompanied by a person who satisfies one or more criteria;
wherein determining that the use of the electronic key satisfies the one or more conditions on use of the electronic key comprises:
receiving presence data that indicates the identity of a person that accompanies the recipient when the use of the electronic key is attempted; and
determining that the person satisfies the one or more criteria and that the person accompanies the recipient; and
wherein transmitting the access code that unlocks the physical lock comprises transmitting the access code that unlocks the physical lock in response to determining that the person satisfies the one or more criteria and that the person accompanies the recipient.

16. The system of claim 6, wherein the operations further comprise:
receiving, based on input from the user, data indicating that the user authorizes the recipient to transfer the electronic key to one or more other users of the social networking platform;
receiving, based on input from the user, data indicating one or more restrictions on the transfer of the electronic key by the recipient;
receiving, based on input from the recipient, a request to transfer the electronic key to a second recipient that has not been granted an electronic key to the physical lock;
determining that the transfer to the second recipient satisfies the one or more restrictions on transfer of the electronic key by the recipient; and
in response to determining that the transfer to the second recipient satisfies the one or more restrictions on transfer of the electronic key by the recipient:
storing, in the electronic storage, second key data that identifies the second recipient of the electronic key, the physical lock for which the electronic key is granted, and the one or more conditions on use of the electronic key;
accessing, from profile data for the second recipient from the social networking platform, an electronic address for the second recipient; and
transmitting, to the electronic address for the second recipient, data that (i) indicates that the electronic key is transferred to the second recipient and (ii) enables the recipient to use the electronic key in accordance with the one or more conditions on use of the electronic key.

17. The system of claim 6, wherein receiving, based on input provided by a user, data identifying the recipient for the electronic key to the physical lock comprises receiving, based on input provided by the user through the social networking platform, the data indicating a recipient for the electronic key to the physical lock;
- wherein receiving, based on input provided by the user, data identifying the physical lock to which the user desires to provide the electronic key comprises receiving, based on input provided by the user through the social networking platform, data identifying the physical lock to which the user desires to provide the electronic key;
- wherein receiving, based on input provided by the user, data indicating the one or more conditions on use of the electronic key comprises receiving, based on input provided by the user through the social networking platform, the data indicating the one or more conditions on use of the electronic key; and
- wherein transmitting the data indicating that the electronic key is transferred to the recipient comprises transmitting, through the social networking platform, the data indicating that the electronic key is transferred to the recipient.

18. The system of claim 6, wherein receiving, based on input provided by a user, data identifying the recipient for the electronic key comprises receiving input provided by the user through a service that operates independently from the social networking platform and that accesses profile data for the recipient through electronic communications with the social networking platform.

19. At least one non-transitory computer-readable storage medium encoded with executable instructions that, when executed by at least one processor, cause the at least one processor to perform operations comprising:
- receiving, based on input provided by a user, data identifying a recipient for an electronic key to a physical lock, the recipient being connected to the user in a social networking platform;
- receiving, based on input provided by the user, data identifying the physical lock to which the user desires to provide the electronic key;
- receiving, based on input provided by the user, data indicating one or more conditions on use of the electronic key;
- determining that the user has authority to issue the electronic key to the physical lock;
- in response to determining that the user has authority to issue the electronic key to the physical lock, storing, in electronic storage, key data that identifies the recipient of the electronic key, the physical lock for which the electronic key is granted, and the one or more conditions on use of the electronic key;
- accessing, from profile data for the recipient from the social networking platform, an electronic address for the recipient;
- transmitting, to the electronic address for the recipient, data that indicates that the electronic key is transferred to the recipient; and
- transmitting, to the electronic address for the recipient, data that enables the recipient to use the electronic key in accordance with the one or more conditions on use of the electronic key.

20. A method comprising:
- receiving, based on input provided by a user, data indicating a recipient for an electronic key to a physical lock, the recipient being connected to the user in a social networking platform;
- receiving, based on input provided by the user, data identifying the physical lock to which the user desires to provide the electronic key;
- receiving, based on input provided by the user, data indicating one or more conditions on use of the electronic key;
- storing, in electronic storage, key data that identifies the recipient of the electronic key, the physical lock for which the electronic key is granted, and the one or more conditions on use of the electronic key;
- accessing, from profile data for the recipient from the social networking platform, an electronic address for the recipient;
- transmitting, to the electronic address for the recipient, data that indicates that the electronic key is transferred to the recipient; and
- transmitting, to the electronic address for the recipient, data that enables the recipient to use the electronic key in accordance with the one or more conditions on use of the electronic key.

* * * * *